(12) United States Patent
Akbarzadeh Shafaroud et al.

(10) Patent No.: US 12,676,257 B2
(45) Date of Patent: Jul. 7, 2026

(54) METAMATERIAL AND METADAMPER

(71) Applicant: THE ROYAL INSTITUTION FOR THE ADVANCEMENT OF LEARNING/MCGILL UNIVERSITY, Montréal (CA)

(72) Inventors: Abdolhamid Akbarzadeh Shafaroud, Pointe-Claire (CA); Miralireza Seyedkanani, Montréal (CA)

(73) Assignee: THE ROYAL INSTITUTION FOR THE ADVANCEMENT OF LEARNING/ MCGILL UNIVERSITY, Montreal (CA)

( * ) Notice: Subject to any disclaimer, the term of this patent is extended or adjusted under 35 U.S.C. 154(b) by 461 days.

(21) Appl. No.: 18/480,232

(22) Filed: Oct. 3, 2023

(65) Prior Publication Data

US 2024/0136100 A1     Apr. 25, 2024

Related U.S. Application Data

(60) Provisional application No. 63/416,047, filed on Oct. 14, 2022.

(51) Int. Cl.
| | |
|---|---|
| *H01F 7/18* | (2006.01) |
| *F16F 1/48* | (2006.01) |
| *F16F 15/121* | (2006.01) |

(52) U.S. Cl.
CPC .............. *H01F 7/1872* (2013.01); *F16F 1/48* (2013.01); *F16F 15/1216* (2013.01)

(58) Field of Classification Search
CPC ........ H01F 7/0242; H01F 7/1872; F16F 1/48; F16F 6/005; F16F 6/00; F16F 7/00; F16F 2236/08; F16F 2238/024; F16F 15/18; F16F 15/03; F16F 2222/06; F16F 2232/02
USPC ........................................................ 188/267
See application file for complete search history.

(56) References Cited

U.S. PATENT DOCUMENTS

| | | | | |
|---|---|---|---|---|
| 8,616,536 B2 * | 12/2013 | Kim | ........................ | F16F 7/1011 |
| | | | | 188/380 |
| 2015/0167770 A1 * | 6/2015 | Trangbaek | .............. | F16F 6/005 |
| | | | | 280/5.515 |
| 2019/0250360 A1 * | 8/2019 | Liu | ......................... | G02B 7/001 |
| 2021/0322127 A1 * | 10/2021 | Martin | .................... | A61B 34/76 |

FOREIGN PATENT DOCUMENTS

| | | | | |
|---|---|---|---|---|
| JP | 6311074 B2 * | 4/2018 | ............. | G04B 17/32 |
| KR | 101807633 B1 * | 12/2017 | ............. | H02K 15/03 |

OTHER PUBLICATIONS

H.Y. Jeong, S.-C. An, I.C. Seo, E. Lee, S. Ha, N. Kim, Y.C. Jun, 3D printing of twisting and rotational bistable structures with tuning elements, Scientific Reports 9(1) (2019).

(Continued)

*Primary Examiner* — Robert A. Siconolfi
*Assistant Examiner* — San M Aung
(74) *Attorney, Agent, or Firm* — Norton Rose Fulbright Canada LLP; Alexandre Daoust

(57) ABSTRACT

The specification describes assemblies of rotary components in which a magnetic engagement is used as a negative incremental stiffness component and a torsion spring is used as a positive incremental stiffness component to provide new or improved meta-functionalities.

21 Claims, 21 Drawing Sheets

(56)            References Cited

OTHER PUBLICATIONS

A. Caciagli, R.J. Baars, A.P. Philipse, B.W.M. Kuipers, Exact expression for the magnetic field of a finite cylinder with arbitrary uniform magnetization, Journal of Magnetism and Magnetic Materials 456 (2018) 423-432.

A. Guell Izard, L. Valdevit, Magnetoelastic Metamaterials for Energy Dissipation and Wave Filtering, Advanced Engineering Materials 22(2) (2020) 1901019.

A. Rafsanjani, A. Akbarzadeh, D. Pasini, Snapping Mechanical Metamaterials under Tension, Advanced Materials 27 (39) (2015) 5931-5935.

A. Rafsanjani, D. Pasini, Bistable auxetic mechanical metamaterials inspired by ancient geometric motifs, Extreme Mechanics Letters 9 (2016) 291-296.

A. Zareei, B. Deng, K. Bertoldi, Harnessing transition waves to realize deployable structures, Proceedings of the National Academy of Sciences 117(8) (2020) 4015-4020.

B. Haghpanah, L. Salari-Sharif, P. Pourrajab, J. Hopkins, L. Valdevit, Multistable Shape-Reconfigurable Architected Materials, Advanced Materials 28(36) (2016) 7915-7920.

D. Restrepo, N.D. Mankame, P.D. Zavattieri, Phase transforming cellular materials, Extreme Mechanics Letters 4 (2015) 52-60.

D.M. Kochmann, K. Bertoldi, Exploiting Microstructural Instabilities in Solids and Structures: From Metamaterials to Structural Transitions, Applied Mechanics Reviews 69(5) (2017) 050801.

G. Librandi, E. Tubaldi, K. Bertoldi, Programming nonreciprocity and reversibility in multistable mechanical metamaterials, Nature Communications 12(1) (2021).

H. Fang, T.-S. Chang, K. Wang, Magneto-origami structures: Engineering multi-stability and dynamics via magnetic-elastic coupling, Smart Materials and Structures 29(1) (2019) 015026.

H. Fu, K. Nan, W. Bai, W. Huang, K. Bai, L. Lu, C. Zhou, Y. Liu, F. Liu, J. Wang, M. Han, Z. Yan, H. Luan, Y. Zhang, Y. Zhang, J. Zhao, X. Cheng, M. Li, J.W. Lee, Y. Liu, D. Fang, X. Li, Y. Huang, Y. Zhang, J.A. Rogers, Morphable 3D mesostructures and microelectronic devices by multistable buckling mechanics, Nature Materials 17(3) (2018) 268-276.

I. Leahu-Aluas, F. Abed-Meraim, A proposed set of popular limit-point buckling benchmark problems, Structural Engineering and Mechanics 38(6) (2011) 767-802.

J. Meaud, K. Che, Tuning elastic wave propagation in multistable architected materials, International Journal of Solids and Structures 122-123 (2017) 69-80.

J. Shi, H. Mofatteh, A. Mirabolghasemi, G. Desharnais, A. Akbarzadeh, Programmable Multistable Perforated Shellular, Advanced Materials 33(42) (2021) 2102423.

J.P. Udani, A.F. Arrieta, Programmable mechanical metastructures from locally bistable domes, Extreme Mechanics Letters 42 (2021) 101081.

J.R. Raney, N. Nadkarni, C. Daraio, D.M. Kochmann, J.A. Lewis, K. Bertoldi, Stable propagation of mechanical signals in soft media using stored elastic energy, Proceedings of the National Academy of Sciences 113(35) (2016) 9722-9727.

K. Bertoldi, V. Vitelli, J. Christensen, M. Van Hecke, Flexible mechanical metamaterials, Nature Reviews Materials 2 (11) (2017) 1-11.

K. Che, C. Yuan, J. Wu, H. Jerry Qi, J. Meaud, Three-Dimensional-Printed Multistable Mechanical Metamaterials With a Deterministic Deformation Sequence, Journal of Applied Mechanics 84(1) (2017) 011004.

K.K. Dudek, R. Gatt, J.N. Grima, 3D composite metamaterial with magnetic inclusions exhibiting negative stiffness and auxetic behaviour, Materials & Design 187 (2020) 108403.

L. Jin, R. Khajehtourian, J. Mueller, A. Rafsanjani, V. Tournat, K. Bertoldi, D.M. Kochmann, Guided transition waves in multistable mechanical metamaterials, Proceedings of the National Academy of Sciences 117(5) (2020) 2319-2325.

L.S. Novelino, Q. Ze, S. Wu, G.H. Paulino, R. Zhao, , Untethered control of functional origami microrobots with distributed actuation, Proceedings of the National Academy of Sciences 117(39) (2020) 24096-24101.

M. Schaeffer, M. Ruzzene, Wave propagation in reconfigurable magneto-elastic kagome lattice structures, Journal of Applied Physics 117(19) (2015) 194903.

O.H. Yeoh, Some forms of the strain energy function for rubber, Rubber Chemistry and technology 66(5) (1993) 754-771.

R. Khajehtourian, D.M. Kochmann, A continuum description of substrate-free dissipative reconfigurable metamaterials, Journal of the Mechanics and Physics of Solids (2020) 104217.

S. Babaee, J. Shim, J.C. Weaver, E.R. Chen, N. Patel, K. Bertoldi, 3D Soft Metamaterials with Negative Poisson's Ratio, Advanced Materials 25(36) (2013) 5044-5049.

S. Mhatre, E. Boatti, D. Melancon, A. Zareei, M. Dupont, M. Bechthold, K. Bertoldi, Deployable Structures Based on Buckling of Curved Beams Upon a Rotational Input, Advanced Functional Materials (2021) 2101144.

S. Shan, S.H. Kang, J.R. Raney, P. Wang, L. Fang, F. Candido, J.A. Lewis, K. Bertoldi, Multistable Architected Materials for Trapping Elastic Strain Energy, Advanced Materials 27(29) (2015) 4296-4301.

S. Yuan, Y. Sun, J. Zhao, K. Meng, M. Wang, H. Pu, Y. Peng, J. Luo, S. Xie, A tunable quasi-zero stiffness isolator based on a linear electromagnetic spring, Journal of Sound and Vibration 482 (2020) 115449.

T. Chen, X. Zhang, X. Yan, B. Zhang, J. Jiang, D. Huang, M. Qi, R. Sun, Harnessing Magnets to Design Tunable Architected Bistable Material, Advanced Engineering Materials 21(3) (2019) 1801255.

T. Frenzel, C. Findeisen, M. Kadic, P. Gumbsch, M. Wegener, Tailored Buckling, Microlattices as Reusable Light-Weight Shock Absorbers, Advanced Materials 28(28) (2016) 5865-5870.

T.A.M. Hewage, K.L. Alderson, A. Alderson, F. Scarpa, Double-Negative Mechanical Metamaterials Displaying Simultaneous Negative Stiffness and Negative Poisson's Ratio Properties, Advanced Materials 28(46) (2016) 10323-10332.

V. Slesarenko, Planar Mechanical Metamaterials with Embedded Permanent Magnets, Materials 13(6) (2020) 1313.

W. Wu, X. Chen, Y. Shan, Analysis and experiment of a vibration isolator using a novel magnetic spring with negative stiffness, Journal of Sound and Vibration 333(13) (2014) 2958-2970.

X. Feng, Z. Ma, J.V. Macarthur, W. Hong, Magnetic double-network composite capable of large recoverable deformation, Soft Matter 17(3) (2021) 554-562.

X. Tan, B. Wang, K. Yao, S. Zhu, S. Chen, P. Xu, L. Wang, Y. Sun, Novel multi-stable mechanical metamaterials for trapping energy through shear deformation, International Journal of Mechanical Sciences 164 (2019) 105168.

X. Tan, S. Chen, B. Wang, J. Tang, L. Wang, S. Zhu, K. Yao, P. Xu, Real-time tunable negative stiffness mechanical metamaterial, Extreme Mechanics Letters 41 (2020) 100990.

X. Tan, S. Chen, B. Wang, S. Zhu, L. Wu, Y. Sun, Design, fabrication, and characterization of multistable mechanical metamaterials for trapping energy, Extreme Mechanics Letters 28 (2019) 8-21.

X. Xia, A. Afshar, H. Yang, C.M. Portela, D.M. Kochmann, C.V. Di Leo, J.R. Greer, Electrochemically reconfigurable architected materials, Nature 573(7773) (2019) 205-213.

X. Yang, S. Keten, Multi-Stability Property of Magneto-Kresling Truss Structures, Journal of Applied Mechanics 88(9) (2021) 1-39.

Y. Cao, M. Derakhshani, Y. Fang, G. Huang, C. Cao, Bistable Structures for Advanced Functional Systems, Advanced Functional Materials, Advanced Functional Materials (2021) 2106231.

Y. Chen, L. Jin, Reusable Energy—Absorbing Architected Materials Harnessing Snapping-Back Buckling of Wide Hyperelastic cols. Advanced Functional Materials 31(31) (2021) 2102113.

Y. Zheng, X. Zhang, Y. Luo, B. Yan, C. Ma, Design and experiment of a high-static-lowdynamic stiffness isolator using a negative stiffness magnetic spring, Journal of Sound and Vibration 360 (2016) 31-52.

(56)           References Cited

OTHER PUBLICATIONS

Y. Zheng, X. Zhang, Y. Luo, Y. Zhang, S. Xie, Analytical study of
a quasi-zero stiffness coupling using a torsion magnetic spring with
negative stiffness, Mechanical Systems and Signal Processing 100
(2018) 135-151.
Z.G. Nicolaou, A.E. Motter, Mechanical metamaterials with nega-
tive compressibility transitions, Nature materials 11(7) (2012) 608-
613.

\* cited by examiner

Fig. 1B    FOP

Fig. 1D    FSP

Fig. 1E    Angular Displacement

Rotational position of stable equilibrium

Torque

Angular Displacement

METAMATERIAL AND METADAMPER

CROSS-REFERENCE TO RELATED APPLICATION

This application claims priority to provisional U.S. application Ser. No. 63/416,047, filed Oct. 14, 2022, the entire contents of which are hereby incorporated by reference.

BACKGROUND

While research for new meta materials has been going on worldwide for several decades, there still remains room for improvement. In particular, there was a need for rotary meta materials which had more than one stable equilibrium positions, preferably more than two, more preferably more than three. Moreover, there was a need for materials offering opportunities for different, improved, or new meta-functionalities.

SUMMARY

It was found that different, improved, and/or new meta-functionalities could be achieved in rotary assemblies having a torsional spring and further using magnet pairings as elements of negative incremental torsional stiffness. More specifically, it was found that two distinct configurations can be achieved: a first one which will be referred to herein as a metamaterial and said to have a parallel configuration, and a second one which will be referred to herein as a metadamper and said to have a series configuration. The metamaterial may be embodied with a meta-functionality associated with energy trapping, for instance. The metadamper may be embodied with a meta-functionality associated with energy-release. Various embodiments of such configurations can be realized in a manner offering more that two, and even more than three positions of stable equilibrium.

Accordingly the specification can be said to describe assemblies of rotary components in which a magnetic engagement is used as a negative incremental torsional stiffness component and a torsion spring is used as a positive incremental torsional stiffness component to provide new or improved meta-functionalities such as an energy trapping metamaterial or a metadamper.

In accordance with one aspect, there is provided a metamaterial comprising: a first component having a first magnet, a second component having a second magnet, a torsion spring coupling the first component to the second component, the second component being rotatable relative the first component, via application of an external force, between a first rotational configuration of stable equilibrium in which the torsion spring is unloaded and the first magnet is magnetically disengaged from the second magnet, the torsion spring maintaining the first rotational configuration in the absence of the external force; a second rotational configuration of stable equilibrium in which the torsion spring is loaded and the first magnet is magnetically engaged with the second magnet in the second rotational position, the loading of the torsion spring canceling the magnetic engagement and maintaining the second rotational configuration in the absence of the external force.

In accordance with another aspect, there is provided a method of trapping energy in a metamaterial having a first component having a first magnet, a second component having a second magnet, a torsion spring coupling the first component to the second component, the second component being rotatable relative the first component between a first configuration and a second configuration, the method comprising: the unloaded torsion spring maintaining the metamaterial in the first configuration in the absence of an external force; the external force moving the metamaterial from the first configuration to the second configuration sequentially across a peak and a dip of a torque response stemming from the combined action of magnetic engagement between the first magnet and the second magnet and from a loading of the torsion spring; the loading of the torsion spring and the magnetic engagement collaborating in maintaining the second relative angular position in the absence of the external force.

In accordance with another aspect, there is provided a metamaterial comprising: a first component having at least one first magnet; a second component having at least one second magnet, the second component being rotatable relative the first component in a manner to bring the first magnet into magnetic engagement with the second magnet and out from magnetic engagement with the second magnet, the first magnet and the second magnet generating a first torque vs. angular position response curve; a torsion spring coupling the first component to the second component, the torsion spring generating a second torque vs. angular position response curve, the second torque vs. angular position response curve being added to the first torque vs. angular position response curve in an overall torque vs. angular position response curve between the first component and the second component, the overall torque vs. angular position response curve having a first zero torque crossing of positive slope at an angular position of unloading of the torsion spring, a torque peak between the first zero torque crossing and a second zero torque crossing, the second zero torque crossing having a negative slope, and a torque dip between the second zero torque crossing and a third zero torque crossing, the third zero torque crossing having a positive slope.

In accordance with another aspect, there is provided a metadamper comprising: a first component having a first magnet, a second component having a second magnet, the second component being rotatable relative the first component about an axis, a third component rotabable relative the second component about the axis, a torsion spring connecting the second component to the third component, the torsion spring made of a viscoelastic material, a rotational configuration of stable equilibrium of the first component relative the second component and the third component, in which rotational position the torsion spring is unloaded and the first magnet is magnetically engaged with the second magnet, a magnetic attraction force stemming from the engagement between the first magnet and the second magnet maintaining the rotational position in the absence of an external force.

In accordance with another aspect, there is provided a method of damping energy from a rotational force exerted between a first component and a third component of a metadamper, the metadamper further comprising a second component, a torsion spring connecting the second component to the third component, the torsion spring made of a viscoelastic material, the first component having a first magnet and the second component having a second magnet and being rotatable independently relative the first component and relative the third component about a common axis, the method comprising: the unloaded torsion spring and a magnetic engagement between the first magnet and the second magnet maintaining the metadamper in a first configuration in the absence of the external force; the external force rotating the third component relative the first component via a loading of the torsion spring and against a resistance stemming from the magnetic engagement, until the first magnet and the second magnet become disengaged and energy is released via the viscoelasticity of the torsion spring.

In accordance with another aspect, there is provided a method of damping kinetic energy associated to a rotational speed between a first component, and a third component of a metadamper, the metadamper further comprising a second component, a torsion spring connecting the second component to the third component, the torsion spring made of a viscoelastic material, the first component having a first magnet and the second component having a second magnet and being rotatable independently relative the first component and relative the third component about a common axis, the method comprising: the relative rotational speed between the first component and the third component imparting internal strain via a loading of the torsion spring acting against a resistance stemming from the magnetic engagement, until the first magnet and the second magnet become disengaged and energy is released via the viscoelasticity of the torsion spring.

Many further features and combinations thereof concerning the present improvements will appear to those skilled in the art following a reading of the instant disclosure.

DESCRIPTION OF THE FIGURES

In the figures,

FIGS. 1B and 1D present two different relative magnet configurations for the rotary assembly of FIG. 1A—FOP and FSP, respectively, with FIG. 1C being a graph presenting the torque response of the assembly with the configuration of FIG. 1B and FIG. 1E being a graph presenting the torque response of the assembly with the configuration of FIG. 1D;

The load-displacement curve for each element of the series system. The actual path of the series system in (b) load-displacement and (c) energy-displacement curves. The stable equilibrium points are denoted by red dots. The series system have three stable equilibrium points with four configurations two of which occur at an identical displacement $x_s$.

Figure 15:
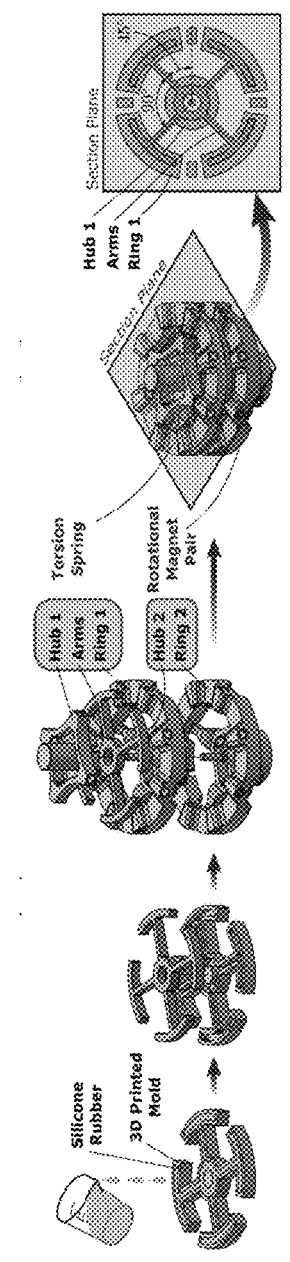
Figure 9:
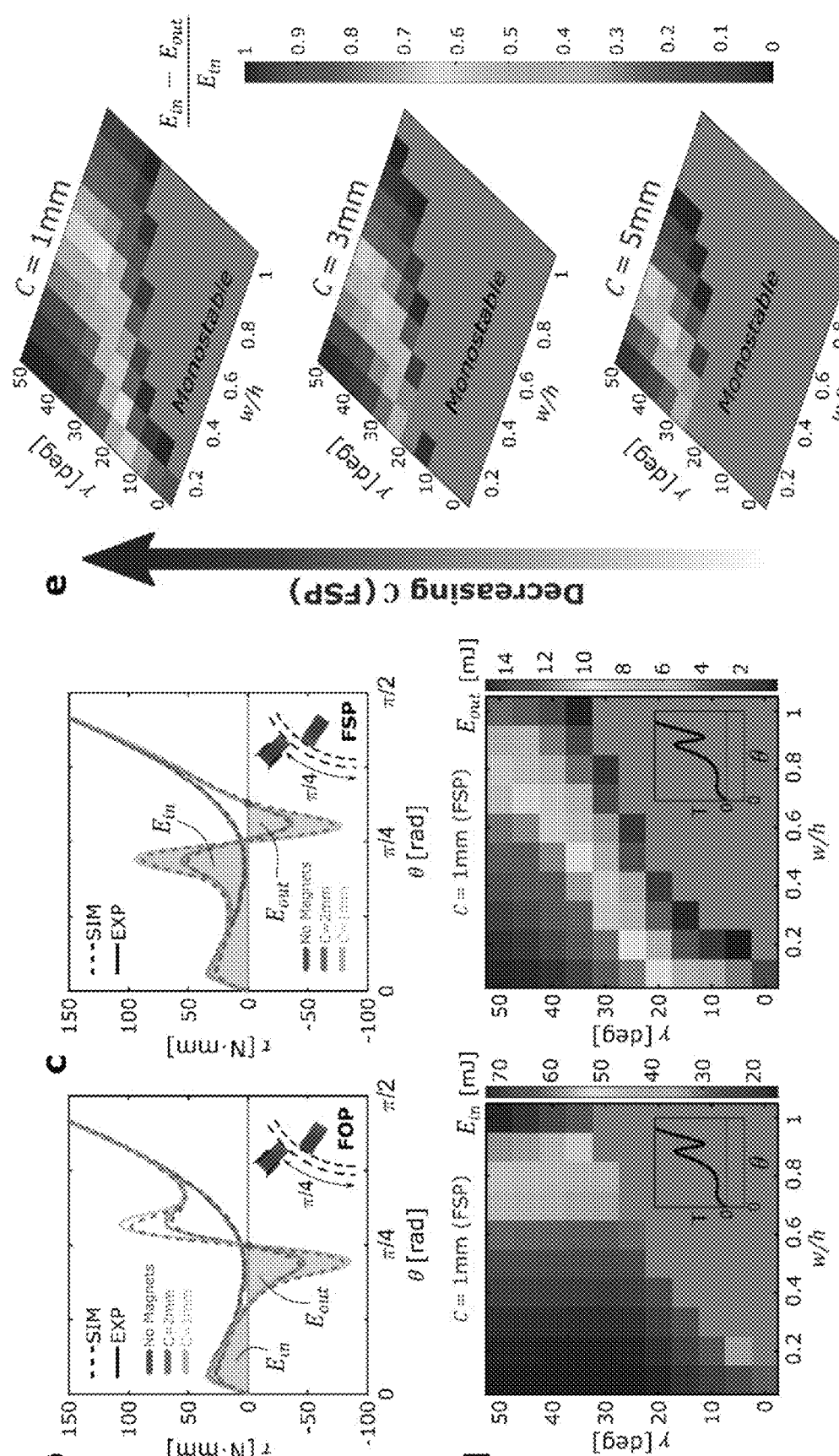

FIG. 15 schematically depicts snap-back induced energy release. (a) Using a torsion spring in series with the rotational system of magnets can yield snap-back instabilities. By comparing the actual path and the loading path in the $\tau$-$\theta$ curve, the energy release during the snap-back instabilities can be identified. It is quantified as the area encompassed between the loading and actual paths. (b) The energy release during snap-back instabilities corresponds to the jumps in the U-$\theta$ curve. (c) Steps in fabricating the torsion spring with elastic arms cast out of silicon rubber in a 3D printed mold and the final assembly in series with the rotational system of magnets. (d) Photo of the assembled system representing a fluid-free rotary metadamper. (e) Predicting the actual path and indicating the effect of reducing the torsional stiffness on the inclination of the $\tau$-$\theta$ curve. (f) A parametric study on how the stiffness coefficients of the system affect the released to the absorbed energy ratio.

Figure 16:
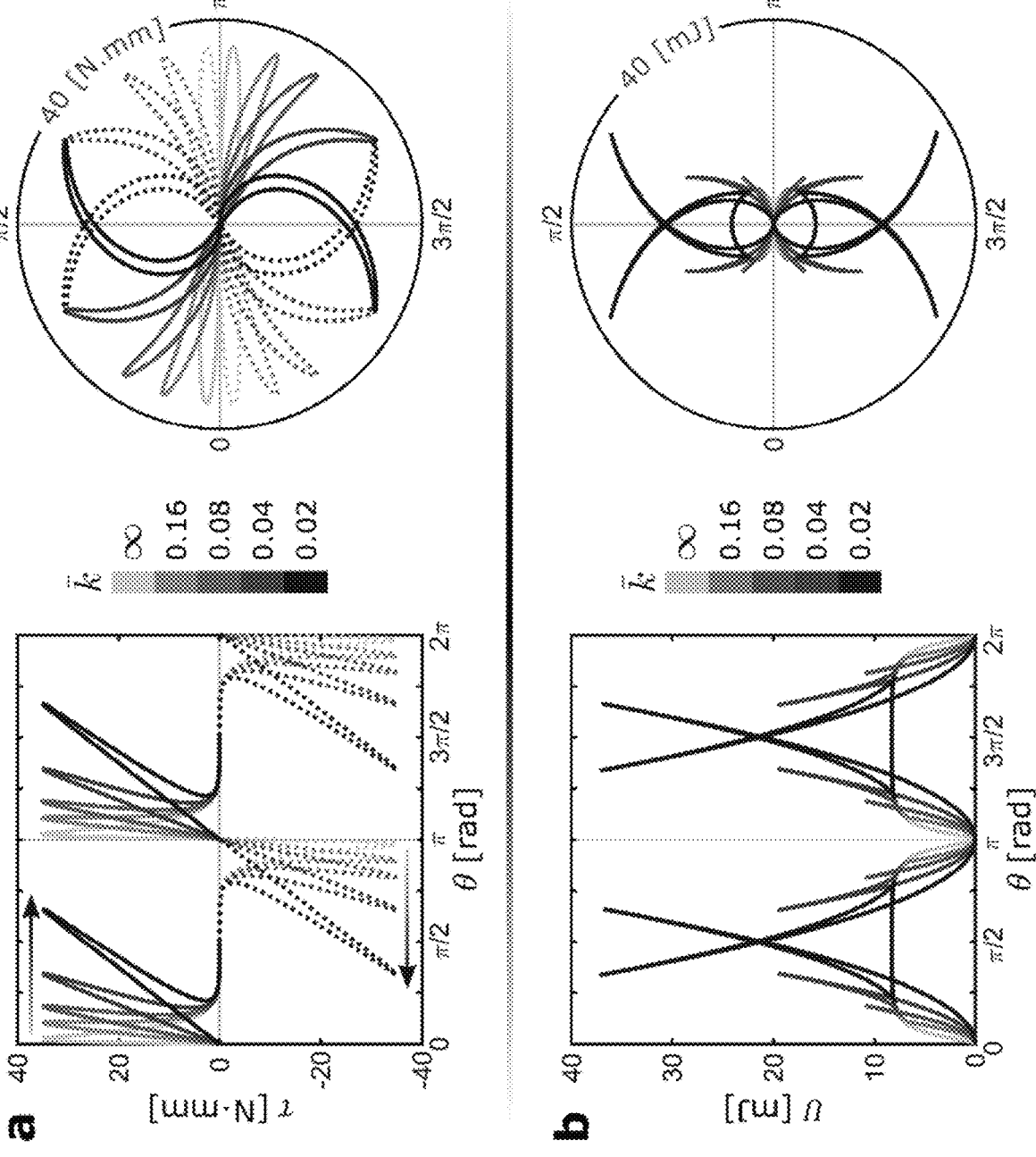

FIG. 16 schematically depicts the Effect of adding a torsion spring with different values of $\overline{K}$ in series with a rotational system of magnets (with two magnets embedded in the ring at $\theta_1=0$ and $\downarrow_1=\pi$, and with C=2.5 mm and $R_o$=30 mm) on (a) $\tau$-$\theta$ and (b) U-$\theta$ curves of the series system.

Figure 17:
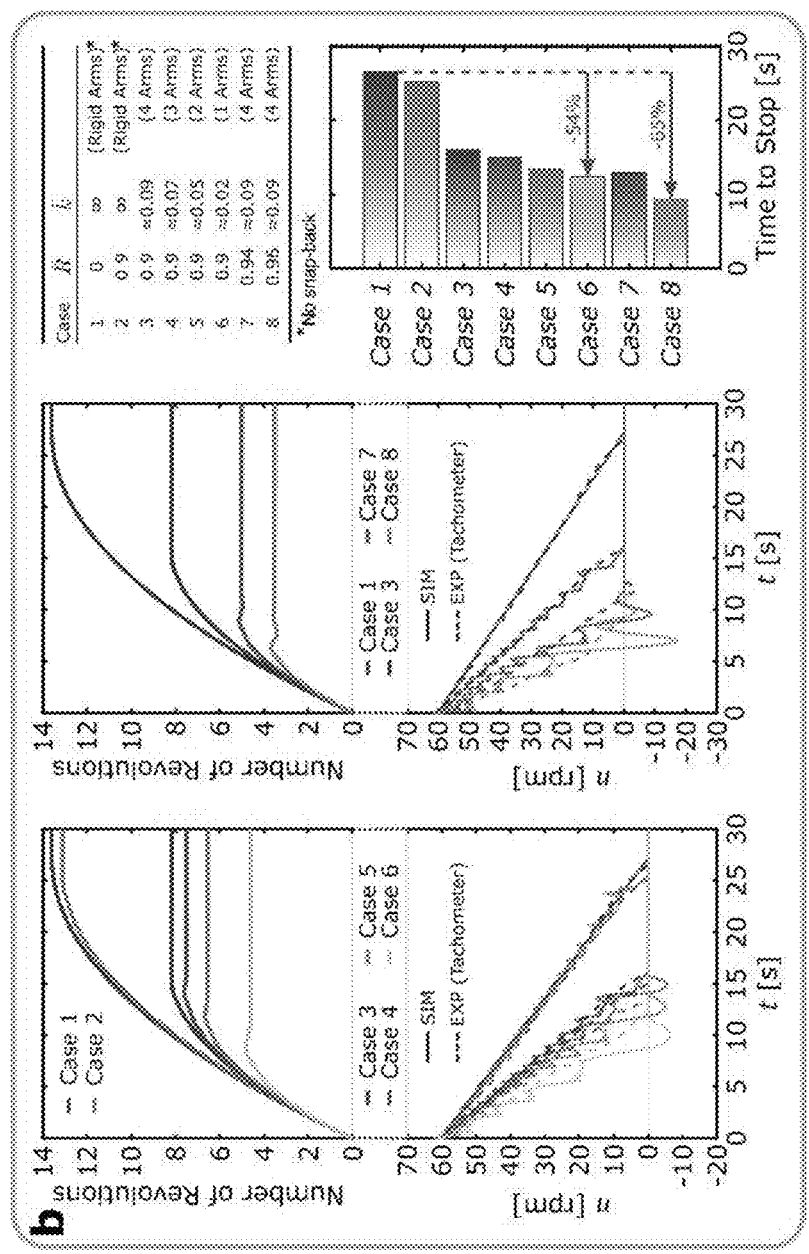
Figure 17:
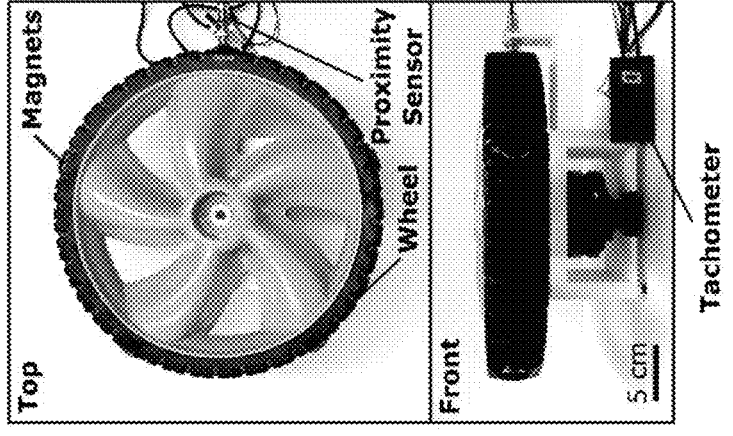

FIG. 17 schematically depicts (a) The experimental setup to measure the efficiency of the metadamper in dissipating the input energy using snap-back induced energy release. (b) Experimental and simulation results indicate the potential of the cyclic multistability to be used as a fluid-free dynamic metadamper.

Figures 6A, 6B, 6C, 6D:
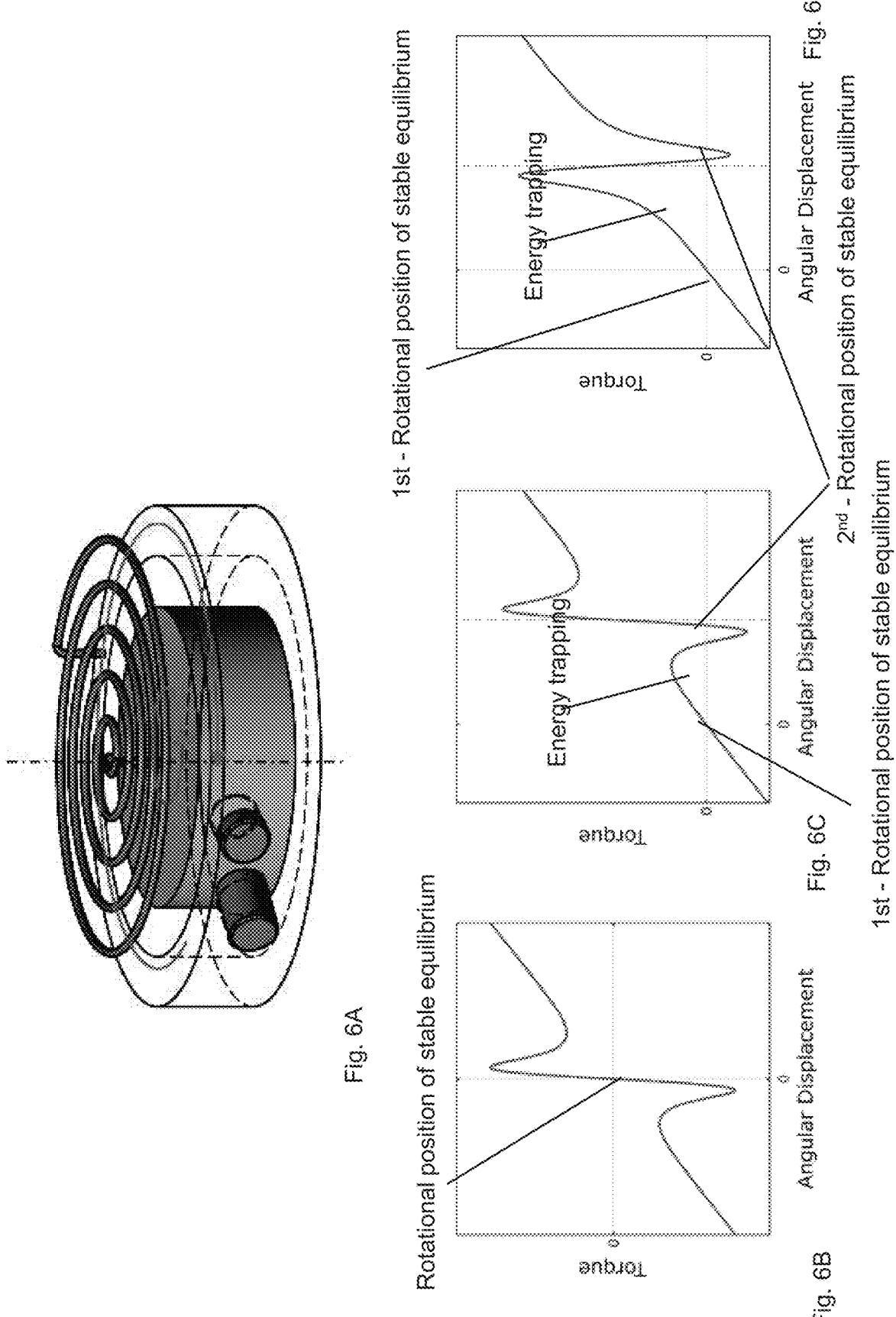
FIG. 6A is a schematic, oblique view of a rotary assembly having both a magnet pair coupling and a torsion spring coupling between a first component and a second component, with FIGS. 6B, 6C and 6D being associated torque response curves for i) an FOP configuration and no dephasing, ii) an FOP configuration with dephasing and iii) an FSP configuration with dephasing, respectively.
Figures 12A, 12B:
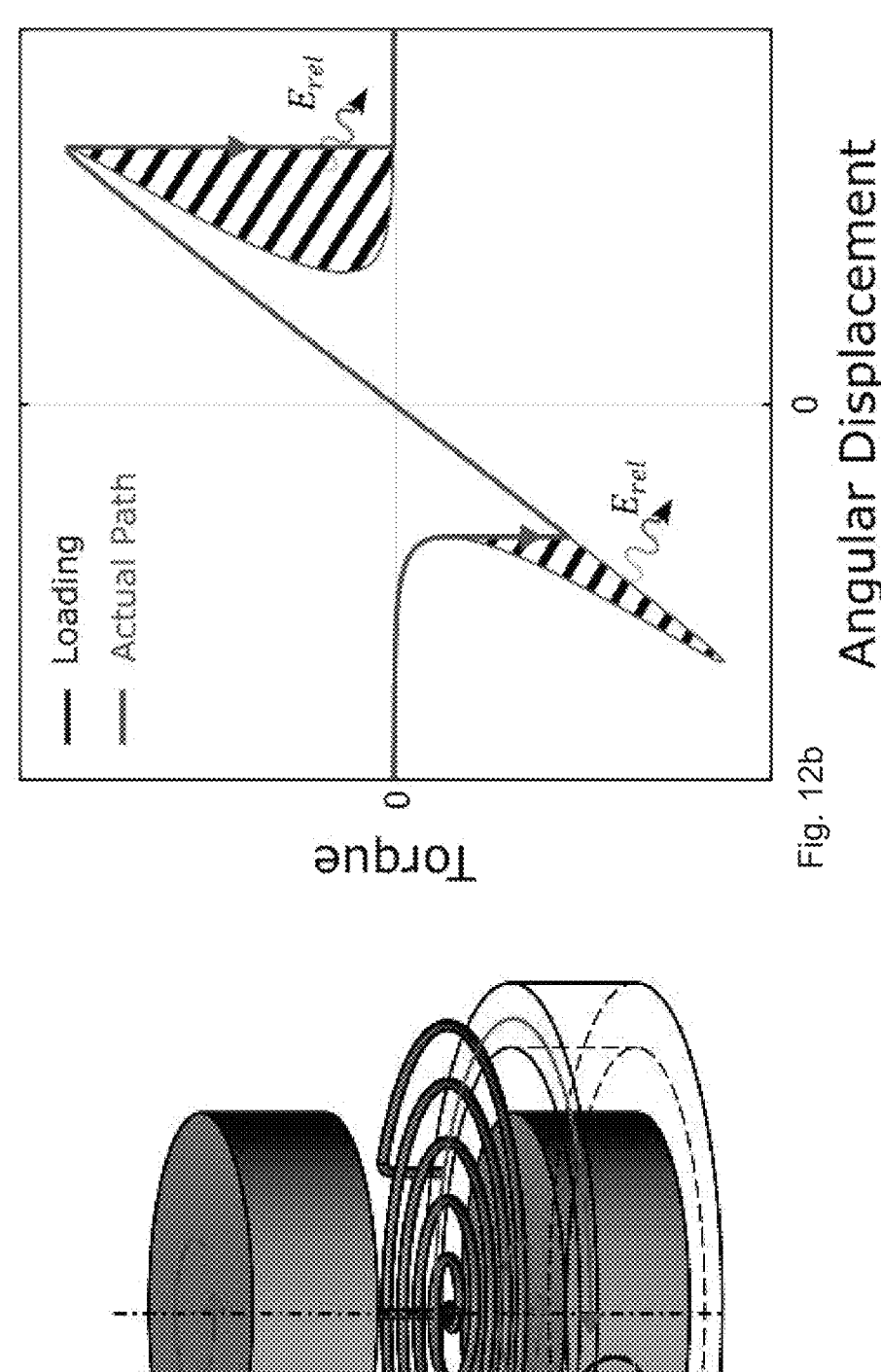
FIG. 12A is a schematic, oblique view of a rotary assembly having a magnet pair coupling between a first and a second component, and a torsion spring coupling between the second and a third component, with FIG. 12B showing the associated torque response curve.
Figure 18:
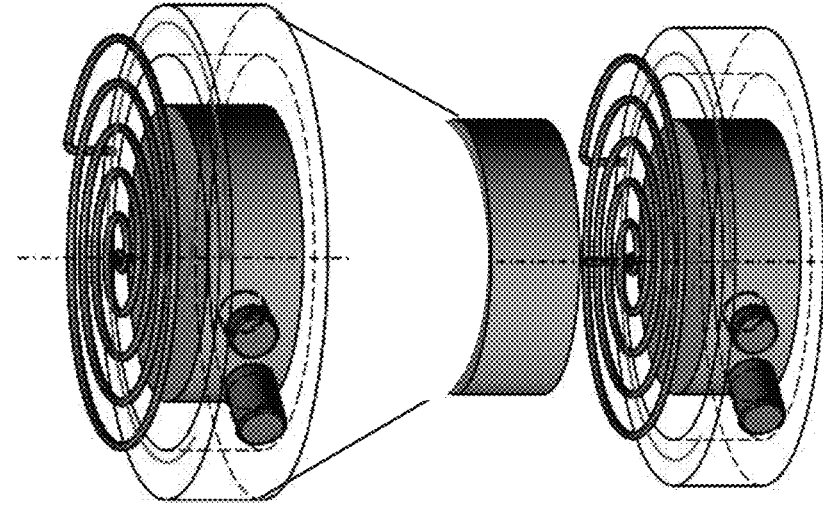
Figure 19:
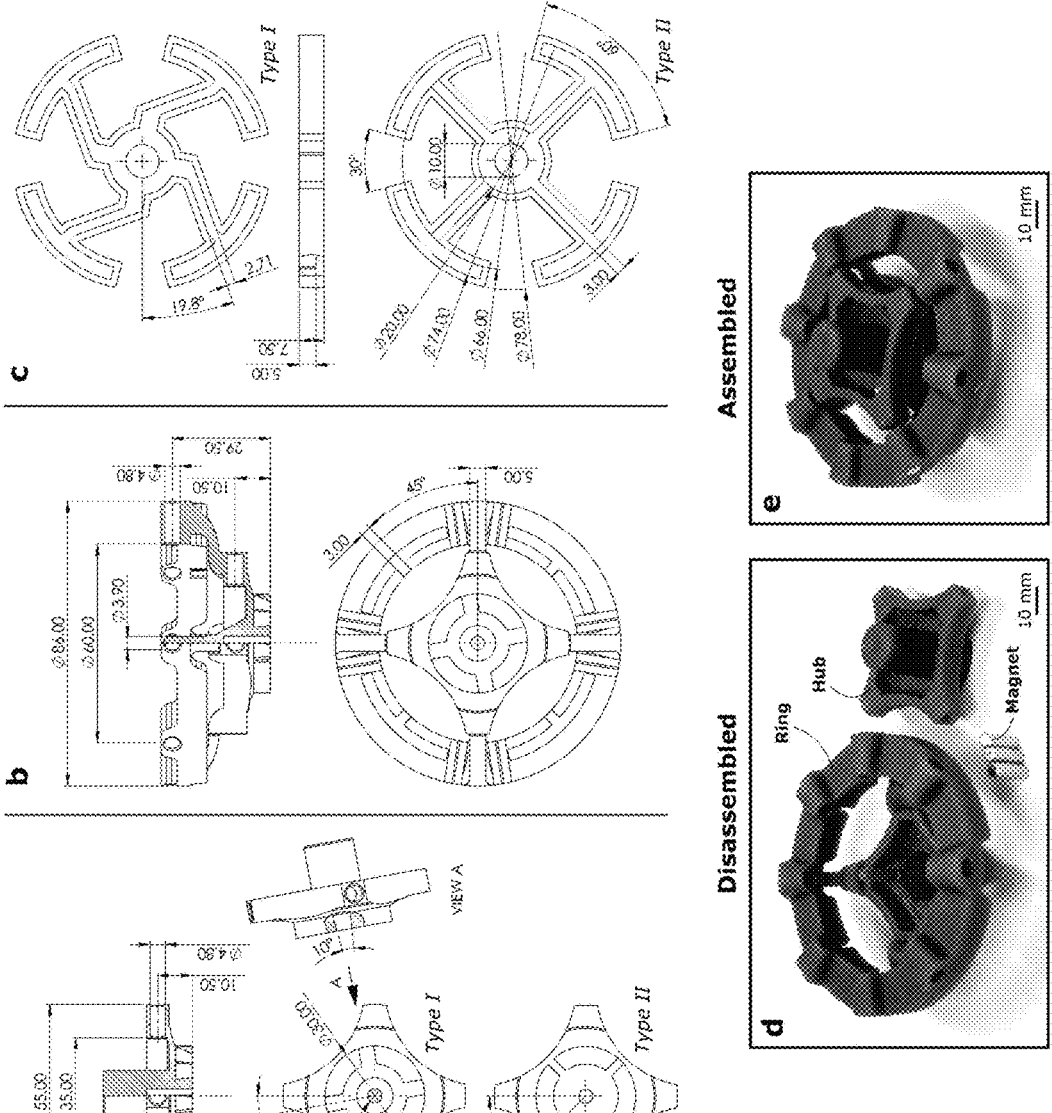

FIG. 18 is a schematic, oblique view of a rotary assembly having an assembly such as presented in FIG. 12A stacked with an assembly such as presented in FIG. 6A, illustrating the possibility of combining metadamping functionalities with energy trapping functionalities;

FIG. 19 presents Detailed drawings of (a) hub, (b) ring (with an attached hub underneath it), and (c) mold. 3D printed parts (d) disassembled and (e) assembled. All the dimensions are in millimeters.

Figure 10:
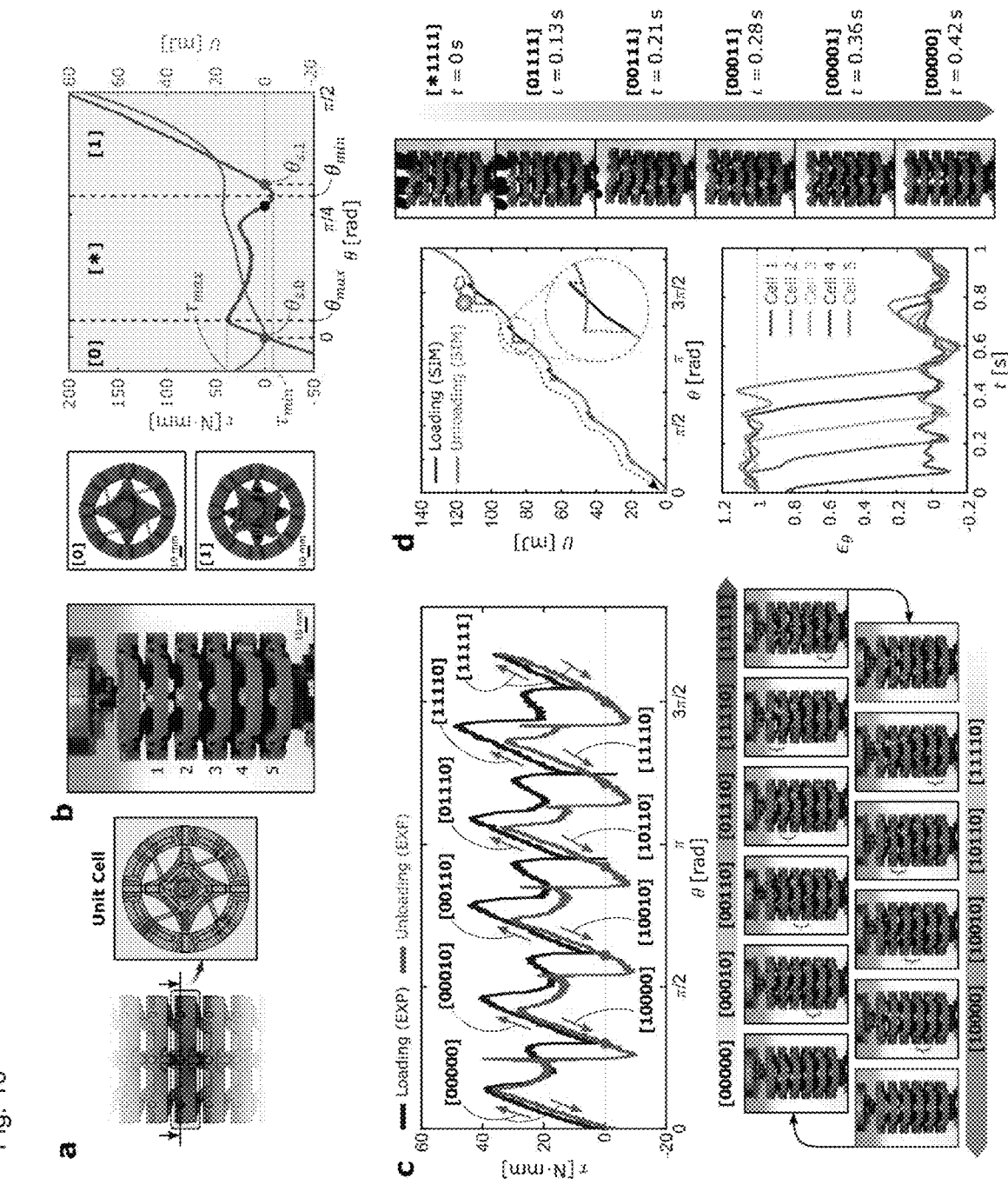
FIG. 10 presents stacking of cells for energy trapping and rotational wave propagation of a 1D rotationally multistable architected material. (a) The architected material with rotational multistability can be realized by tessellating the energy trapping rotational unit cell (enclosed by a box) in the axial direction. (b) The building block of the assembled 1D material with 5 unit cells is the energy trapping unit cell with two stable configurations (states [0] and [1] associated with $\theta=0$ and $\theta=54°$) in which four elastic arms ($\gamma=35°$ and w=2.71 mm) connect the hub to the ring. Two magnets embedded in the hub and the ring form a rotational magnet pair with C=3 mm. (c) Quasi-static displacement controlled loading of the material reveals a multistable behavior with a non-sequential phase shift of unit cells both in loading and unloading paths (the snapshots of the experiment are provided below the curve). (d) The simulated potential energy of the material with respect to the total angular displacement and the corresponding dynamic response of it (accompanied by the snapshots of the experiment). The material can dynamically release the trapped potential energy through rotational wave propagation in a sequence from cell 1 to cell 5 until all the cells are at their initial configuration.
Figure 22:
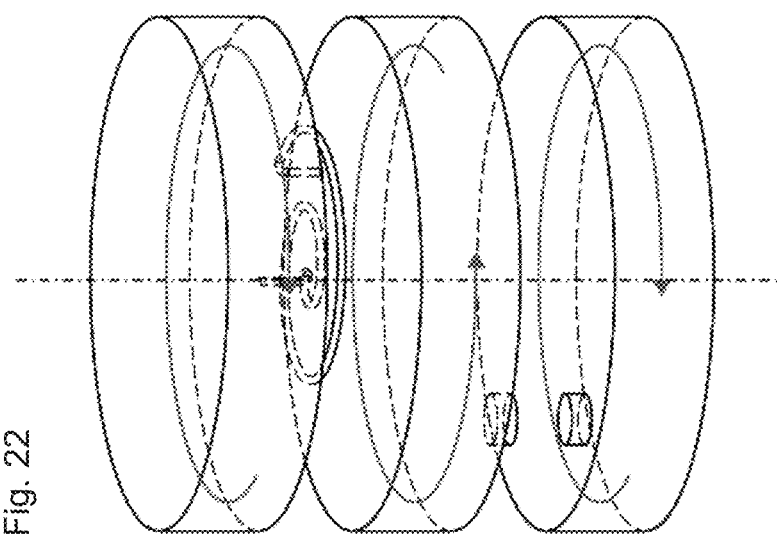
Figure 21:
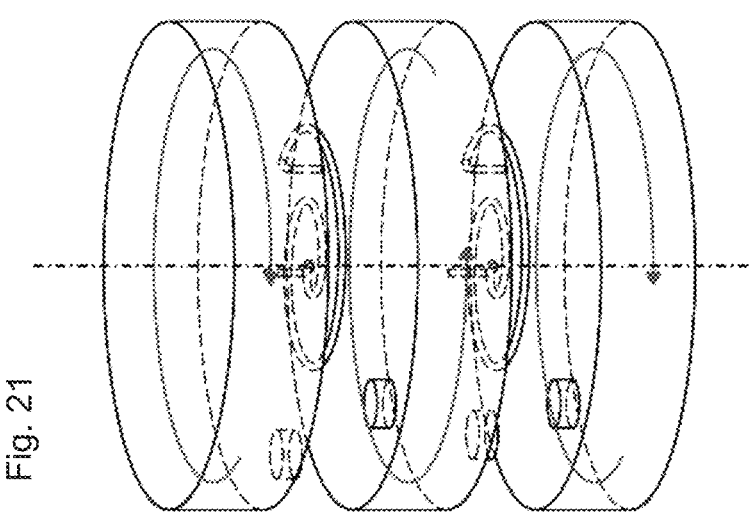
Figure 20:
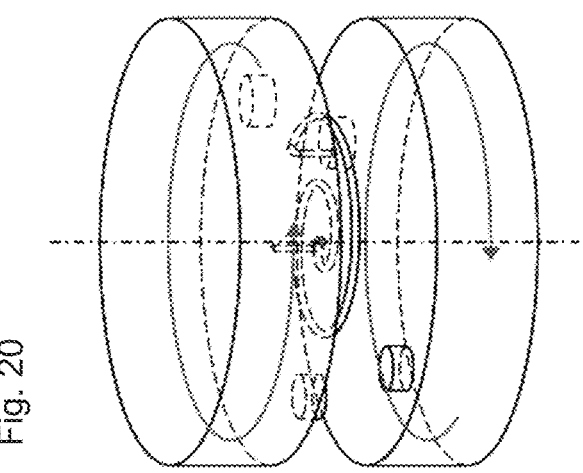

FIG. 20 presents an embodiment having similar functionalities to the embodiment of FIG. 6A, but with an axial configuration;

FIG. 21 presents an embodiment having similar functionalities to the embodiment of FIG. 10B but with only 2 unit cells and an axial configuration; and FIG. 22 presents an embodiment having similar functionalities to the embodiment of FIG. 12A but with an axial configuration.

DETAILED DESCRIPTION

Figures 1A, 1C:
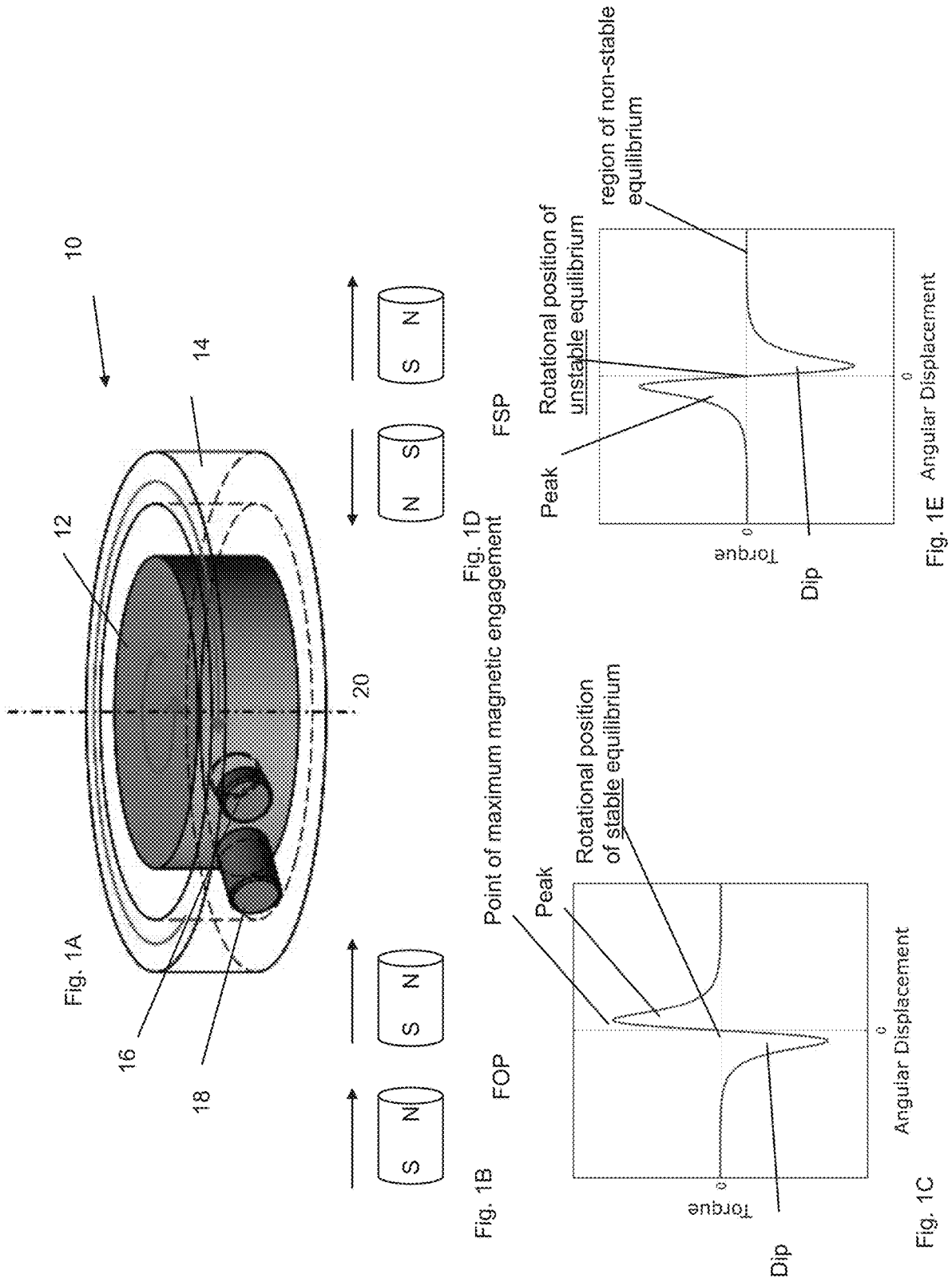
FIG. 1A is a schematic, oblique view of a rotary assembly having a magnet pair coupling.

FIG. 1A shows an example of a rotary assembly 10 having a first component 12 rotatable relative a second component 14. The first component 12 has a first magnet 16, and the second component 14 has a second magnet 18. The first component 12 and second component 14 are rotatable relative one another about an axis 20 in a manner to allow the first magnet 16 to come into alignment with the second magnet 18, in which position the first magnet 16 is closest to the second magnet 18, or rotated away from one another. Magnetic forces between magnets increase exponentially as a function of distance, and therefore the rotary assembly can be configured in a manner for the magnetic engagement between the first and second magnets to be at its fullest when the magnets are aligned, and to otherwise become negligible following a relatively small angular disalignment between the magnets. However, when the alignment is perfect, the net torque between the two components is zero, similarly to when the magnets are moved out from magnetic engagement with one another. The strength of the magnetic engagement can be affected by several factors such as the strength of the magnets, the number of magnets which simultaneously become engaged or disengaged (the illustrated embodiment has a single pair but alternate embodiments could have more than one pair), the degree at which the magnetic field axes of the two magnets are aligned or not in the position of alignment, and the distance, referred to as a gap, between the magnets at the position of angular alignment.

FIG. 1B shows a first relative polarity direction configuration of two magnets in a position of alignment. This relative polarity direction configuration has magnets with opposite magnetic poles facing each other, and which therefore attract each other. This relative polarity direction configuration can be referred to as FOP herein. In the case of a FOP configuration, or opposite magnet poles facing each other, the torque response curve of the rotary assembly (amplitude of torque as a function of relative angular position/angular displacement) can be as presented in FIG. 1C.

FIG. 1D shows a second relative polarity direction configuration of two magnets in a position of alignment. This relative polarity direction configuration has magnets with same magnetic poles facing each other, and which therefore repel each other. This relative polarity direction configuration can be referred to as FSP herein. In the case of a FSP configuration or same magnet poles facing each other, the torque response curve of the rotary assembly can be as presented in FIG. 1E. It will be noted that the torque response curve presented in FIG. 1E mirrors the torque response curve presented in FIG. 1C.

The torque response curves of both FIG. 1C and FIG. 1E can be seen to have a position of equilibrium evidenced by the zero torque crossing presented here at the center of the graphs. The slope of the torque response curve at the zero torque crossing is of significant amplitude, defining the position in a relatively sharp manner (significant torque will quickly appear upon angular displacement away from the position), by contrast with the relatively large angular domain of negligible torque corresponding here with the region of magnetic disengagement between the two magnets. In the case of FIG. 1C, the position of equilibrium is stable, as evidenced by the positive value of the slope of the torque response curve at the zero torque crossing. In other words, the torque which appears upon angular displacement away from the position is restoring, attracting torque, which tends to bring the system back into the position of equilibrium against potential minor disruptions caused by an external force. By contrast, in the case of FIG. 1E, the position of equilibrium is unstable, as evidenced by the negative value of the slope of the torque response curve at the zero torque crossing. In other words, in the FSP configuration, the torque which appears upon angular displacement away from the position is destabilizing, repelling torque, which tends to move the system our from the position of equilibrium as soon as a very slight external force nudges the relative position. Accordingly, the configuration associated to the graph of FIG. 1C can be said to have one position of stable equilibrium, whereas the configuration associated to the graph of FIG. 1E may be said to have no position of stable equilibrium (to the extent that the "region" of magnetic disengagement has no resilience to external forces and is also not a clearly defined "position" and not stable).

Figure 2:
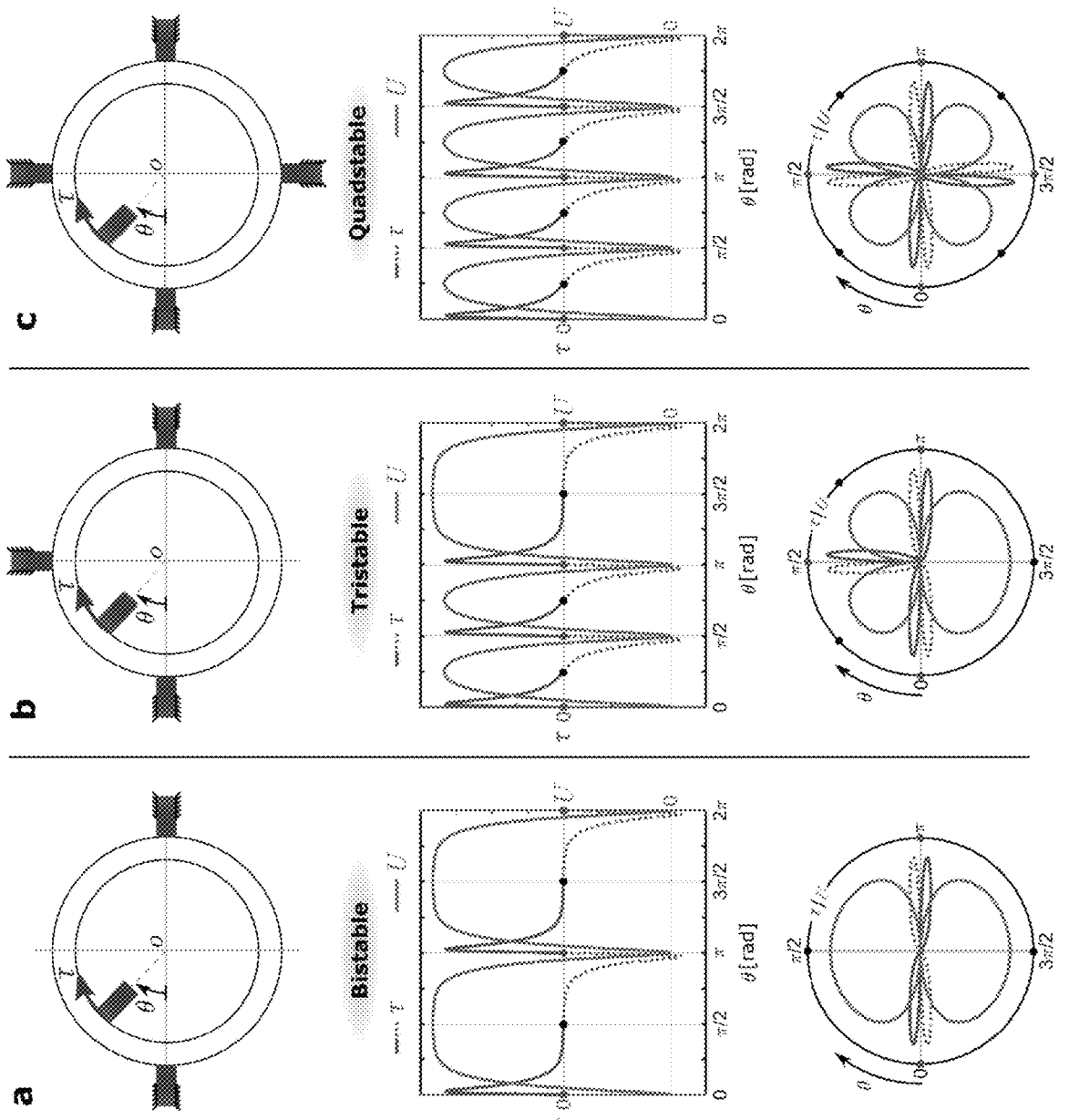
FIG. 2 schematically represents the variation of torque and potential energy with respect to the angular position in rotational system of magnets with (a) two, (b) three, and (c) four magnets in the ring leading to bistable, tristable, and quadstable system (the stable and unstable equilibrium positions are specified with red and black dots, respectively)

FIGS. 2a, 2b, and 2C present alternate configurations where, instead of having two components which each have a single magnet, one of the two components is provided with a greater number of magnets than the other, allowing for potential engagement between the magnet of a first component with different magnets of the second component, at corresponding angular positions. In the context where these alternate configurations use an opposing polarity configuration as represented in FIG. 1B, these alternate configurations can exhibit bistability (two stable equilibrium positions), tristability (three stable equilibrium positions) or quadristability (four stable equilibrium positions), respectively.

Figure 3:
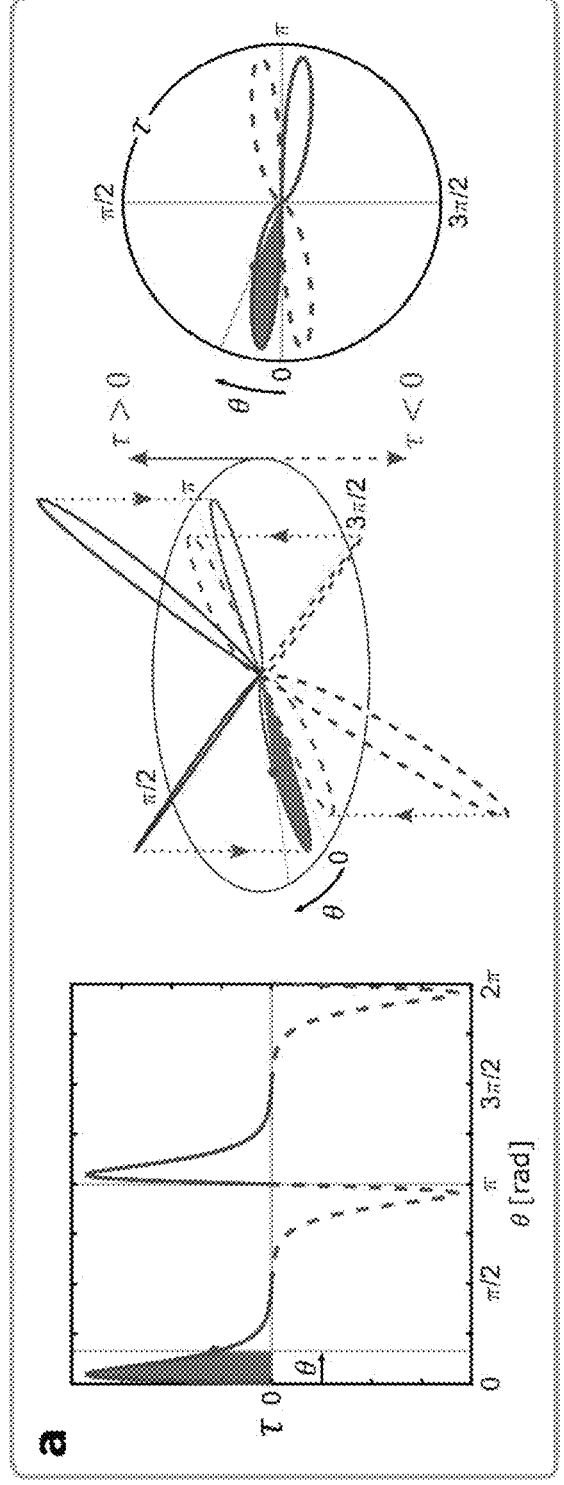
FIG. 3 schematically represents polar representations of torque and energy curves, with the area under the torque curve associated to the potential energy of the system.
Figure 3:
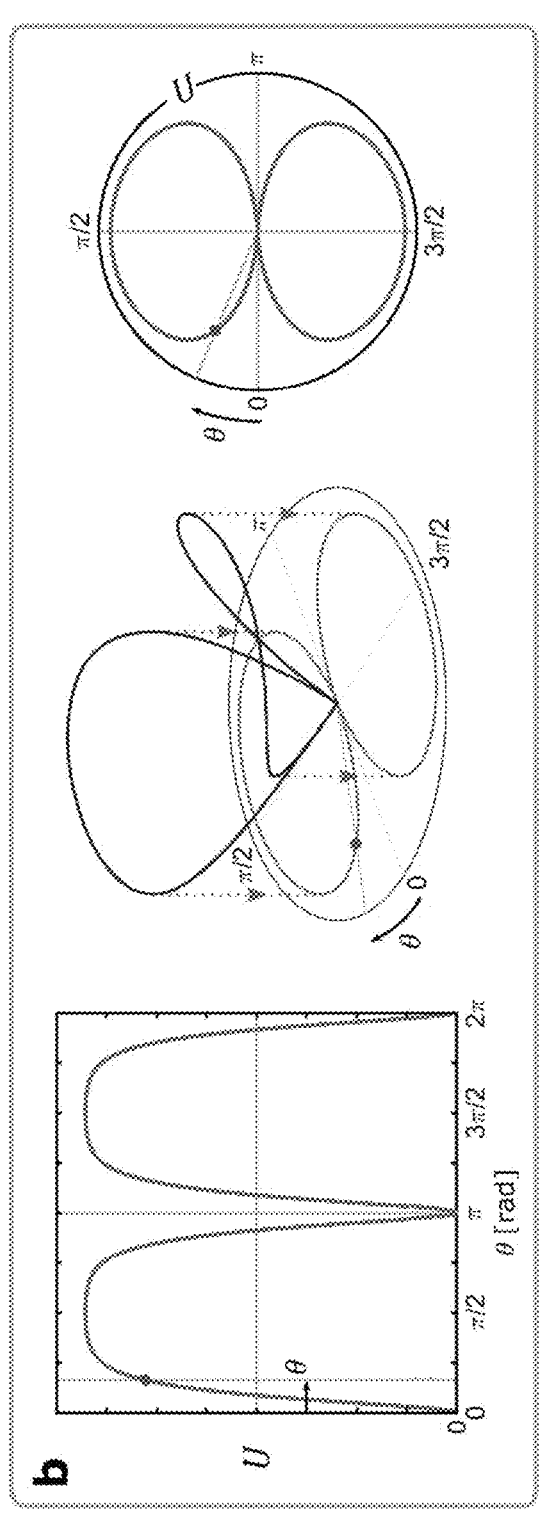

To show the cyclic multistability of a rotational system of magnets, polar representations of the torque (τ) and the potential energy (U) with respect to the angular displacement (θ) such as used at the bottom of FIGS. 2a, 2b and 2c can be convenient. As shown in FIGS. 3a and 3b, such representations can be achieved by transforming plots in Cartesian coordinates into a three dimensional cylindrical representation where the axial coordinate represents the torque or the potential energy with their magnitude also reflected in the radial coordinate. Dashed lines can be used to distinguish negative magnitudes of the torque from positive magnitudes shown in full lines.

No dashed lines are used in plotting the potential energy curve in a scenario where the minimum potential energy of the system is used as the reference (zero potential) with respect to which we calculate the potential energy. The projection of the three-dimensional curves in the cylindrical representation onto the horizontal plane produces the corresponding polar plots.

Returning to FIGS. 2a, 2b and 2c, the number of stable equilibrium positions in rotational system of magnets can be increased by adding more magnets in the first or second component. The figures demonstrate the effect of adding more magnets on τ–θ and U–θ curves. For every one more magnet embedded in the ring, an extra rotational magnet pair is formed and a pair of peaks and valleys is added to these curves. This is also represented by addition of what can be referred to as wings in the polar plots. With two, three, and four magnets in the multi-magnet component, there are two, three, and four distinct stable equilibrium positions, respectively, in one full cycle from 0 to 2 π.

Figures 4A, 4B:
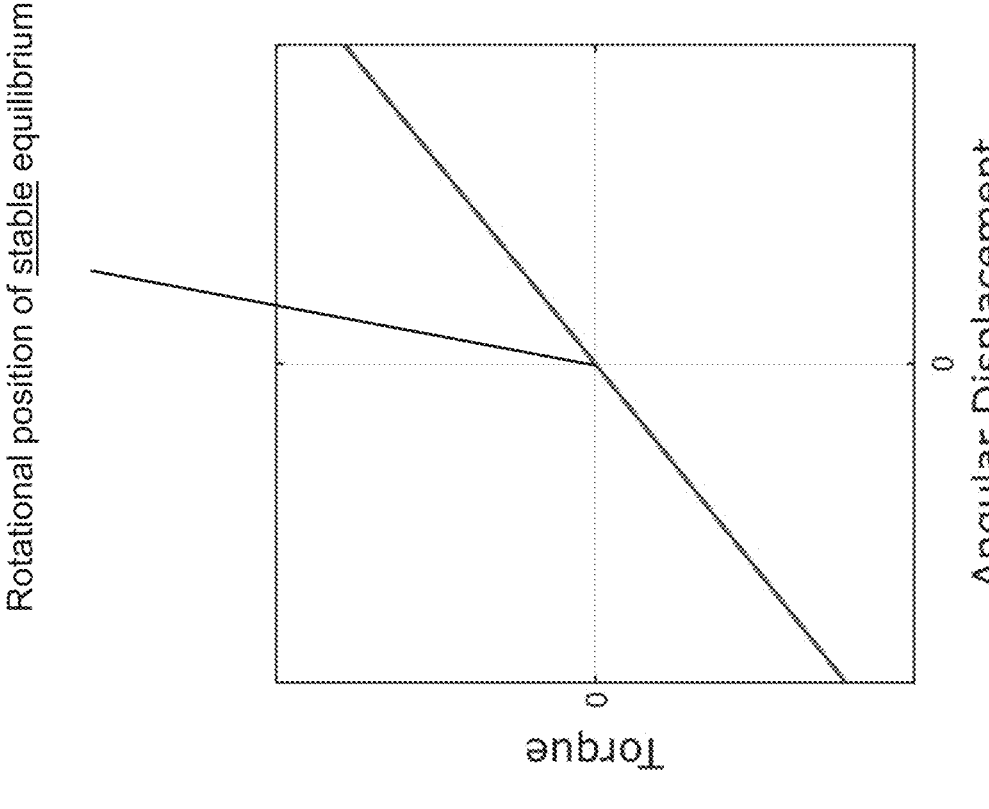
FIG. 4A is a schematic, oblique view of a rotary assembly having a torsion spring coupling, with FIG. 4B being a graph presenting the associated torque response.

Turning now to FIG. 4A, a configuration having a torsion spring connecting the first component to the second component is presented. The torsion spring rotationally couples the first component to the second component in the sense that it generates a torque response curve, shown in FIG. 4B, when the second component is rotated relative the first component. As seen in FIG. 4B, the configuration presented in FIG. 4A can have a single position of stable equilibrium in which the torsion spring is in an unloaded state. When angularly displaced away from the position of stable equilibrium in one angular orientation or another, the torsion spring progressively becomes loaded and generates a progressively increasing restoring, force based on increased values of displacement. In this scenario as well, the slope of the torque response curve at the zero torque crossing is positive, corresponding to the stability of the restoring force configuration. In such a scenario, the amplitude of the slope can correspond to a stiffness of the torsion spring.

Figure 5:
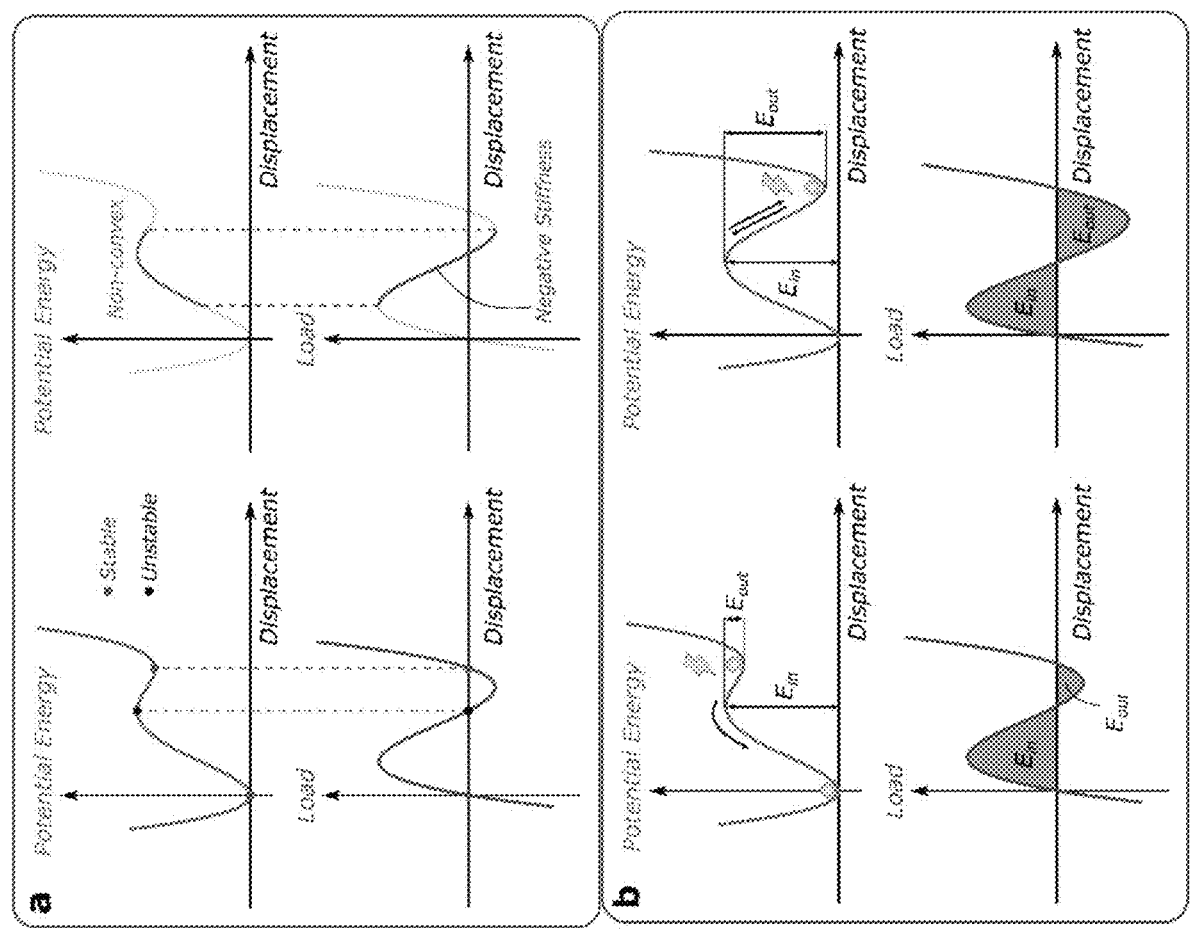
FIG. 5 schematically illustrates concepts associated with snap-through behavior of a bistable element, with (a) representing displacement controlled curves of load and potential energy versus displacement for a typical bistable behavior reveal negative incremental stiffness associated with a non-convex potential energy landscape and (b) the effect of the asymmetry of the potential energy landscape on the energy barriers in loading and unloading directions.

As shown represented in FIG. 5a and FIG. 5b, one example of a bistable element can have two stable equilibrium states between which it can transfer if supplied with the required energy from application of an external force. The quasi-static displacement-controlled curves of load and potential energy versus displacement for a snap-through bistable element are shown in FIG. 3a. The intersection points of the load-displacement curve with the zero load line are equilibrium points, which can be stable or unstable depending on the slope of line tangent to the curve at these points, i.e. incremental stiffness. An equilibrium point with a negative stiffness is unstable, which is also associated with a non-convex potential energy landscape. Therefore, the criteria for a stable equilibrium can be mathematically written as $\partial U/\partial x=0$ and $\partial^2 U/\partial x^2>0$, which represent the first and second derivatives of the potential energy with respect to the displacement, respectively.

With no energy release or dissipations, the energy required to move the bistable element from the initial undeformed configuration to the deformed one in a displacement-controlled manner and cross the energy barrier in the loading direction is equal to the increase in the potential energy of the element until the unstable equilibrium point. This increase in the potential energy is equivalent to the area under the load-displacement curve above the zero load line and is denoted by $E_{in}$ (FIG. 5b). Accordingly, the reduction in potential energy of the bistable element when moving from the unstable to the second stable equilibrium point is represented by $E_{out}$ and is equal to the energy required to pass the energy barrier in the unloading direction (the enclosed area by the load-displacement curve below the zero load line). The amount of energy trapped in the bistable element can therefore be quantified by $E_{in}-_{out}$ A highly asymmetric potential energy landscape yields a bigger difference between $E_{in}$ and $E_{out}$. Although it can be considered beneficial from the energy trapping perspective, it might lead to marginal bistability, e.g. in case of inadequate $E_{out}$, in which the element cannot retain its deformed configuration in the presence of environmental disturbances. In contrary, decreasing the asymmetry of the potential energy landscape results in a stronger bistability but smaller trapped energy (FIG. 5b).

In the context where the configurations illustrated in FIGS. 2a, 2b, and 2c do not exhibit asymmetry of the potential energy landscapes, while these configurations do exhibit multi-stability, they do not exhibit the functionality of energy trapping, and the embodiment of FIG. 4A does not exhibit multi-stability to begin with.

FIG. 6A presents an example embodiment of a meta material which may be configured in a manner to exhibit an energy trapping functionality. In the embodiment of FIG. 6A, the first component and the second component are coupled both via i) rotationally alignable magnets and ii) a torsion spring.

FIG. 6B presents a torque response curve for a first configuration of the example embodiment presented in FIG. 6A, in which the angular position in which the magnets are aligned corresponds to a fully unloaded state of the torsion spring. In this first embodiment, the overall torque response curve corresponds to the sum of the individual torque response curves for spring coupling (FIG. 4A) and of the torque response curve for the magnet coupling in the FOP configuration (FIG. 1C). This curve only shows one stable equilibrium point (only one intersection with the zero-torque line). Therefore the system is not bistable and cannot be used for energy trapping.

FIG. 6C presents a torque response curve for a second configuration of the example embodiment presented in FIG. 6A, but in which a phase shift is introduced. More specifically, the angular position in which the magnets are aligned correspond to a partially loaded state of the torsion spring. Here, there are two rotational positions of stable equilibrium. A first rotational position of stable equilibrium is present at a reference angular position corresponding to a fully unloaded state of the torsion spring in which the magnets are magnetically disengaged. Indeed, in the vicinity of this first rotational position of stable equilibrium, the magnetic force effect can be negligible, and the main factor affecting the torque response curve can be the torsion spring. A second rotational position of stable equilibrium is present at a reference angular position corresponding to an equilibrium between the negative incremental torsional stiffness stemming from the magnetic engagement between the magnet pair(s), and the positive incremental torsional stiffness stemming from the loading of the torsion spring. Here, the negative incremental torsional stiffness stemming from the magnetic engagement between the magnet pairs is of an amplitude sufficient, relative the positive incremental torsional stiffness of the torsional spring, to bring the torque response curve back below the zero torque line. In fact, the phase shift results in a torque-displacement curve that intersects the zero-torque line in three places, which are all equilibrium points, but only two of which are stable (positive slope). The overall appearance of the torque response curve includes a peak between a first zero crossing and a second zero crossing, a dip between the second zero crossing and the third zero crossing, followed by another peak.

The fully aligned position of the magnets is illustrated by a dashed vertical line and it can be seen that the second rotational position of stable equilibrium occurs slightly before that vertical line, meaning that in this embodiment, when the meta material is in the second rotational position of stable equilibrium, the magnets are slightly angularly offset from one another as the force of the magnets is compensated by the force of the torsion spring. More specifically, the disalignment of the magnets occurs in an angular direction towards the reference position where the torsion spring is fully unloaded. The dip in torque caused by the destructive interference of the magnetic attraction occurs before the peak in torque caused by the constructive interference of the magnetic attraction, in the direction of positive angular displacement and the second rotational position of stable equilibrium is associated with the dip in torque.

It will be noted that for the negative incremental torsional stiffness stemming from the magnetic engagement between the magnet pair(s) to cause a second rotational position of stable equilibrium, the relative effect of the magnetic engagement may need to be sufficient to bring the torque response curve back below the zero torque line. For larger phase shifts between the magnets, corresponding to larger amplitudes of the torque stemming from the torsion spring, the overall response curve might not intersect with the zero-torque line and as such, lead to no bistability nor energy trapping functionality. In this case, we might need stronger magnets, more than two magnet pairs, or a lower air gap between them to shift the curve down and make it intersect with the zero-torque line. Therefore, to allow energy-trapping functionality, there may need to be a balance between several parameters, such as: magnets strength or the air gap between the magnets or simultaneous engagement of several pairs of magnets; stiffness of torsion spring; phase difference between the magnet pair(s), and/or, the use of a torsion spring having a non-linear response (as will be presented below).

FIG. 6D presents a torque response curve for a third configuration of the example embodiment presented in FIG. 6A. The configuration is similar to the one leading to the torque response curve presented in FIG. 6C, in the sense that the phase shift remains present, but is different in that the magnets are now in the same pole facing each other configuration, or FSP configuration which had been depicted in FIG. 1D, instead of opposing pole facing each other configuration, or FOP configuration which led to the torque response curve of FIG. 6C. Interestingly, in this configuration, constructive interference occurs between the peak in torque associated with the magnetic engagement and the torque associated with the torsion spring. Consequently, a single peak in torque occurs, before the dip associated to the second position of stable equilibrium. While this makes it more difficult to cross the energy barrier leading to the dip, it also means that there is a greater potential for energy trapping. Referring back to the explanations associated with FIGS. 5a and 5b, it will be understood that this positive peak in torque can be associated to a greater amount of energy trapping, which may be beneficial in embodiments where energy trapping is targeted.

More specifically, the fully aligned position of the magnets is illustrated by a dashed vertical line and it can be seen that the second rotational position of stable equilibrium occurs slightly after that vertical line, meaning that in this embodiment, when the meta material is in the second rotational position of stable equilibrium, the magnets are also slightly angularly offset from one another as the force of the magnets is compensated by the force of the torsion spring, but in a direction opposite to the one known to FIG. 6C. More specifically, the disalignment of the magnets occurs in an angular direction away from the reference position where the torsion spring is fully unloaded. The dip in torque caused by the destructive interference of the magnetic attraction on the spring torque occurs after the peak in torque caused by the constructive interference of the magnetic attraction, in the direction of positive angular displacement and the second rotational position of stable equilibrium is associated with the dip in torque. Accordingly, in this embodiment, a single, greater amplitude, peak in torque occurs between the first equilibrium position and the second equilibrium position, followed by a dip in torque, and then by a region where the torsion spring torque dominates the torque response curve.

As presented above, using a torsion spring which has a non-linear torque response curve can be one way to help in providing for a second rotational position of stable equilibrium, providing yet one or more further rotational positions of stable equilibrium, and/or in optimizing energy trapping functionality. Indeed, in the embodiment presented in FIG. 4B, a torsion spring offering a linear torque response curve, was used. Such a torque response curve can be achieved using a coil spring for instance, wherein a body of the spring has a spiral configuration between two ends, and where each end is connected to a corresponding one of the components.

Figure 7:
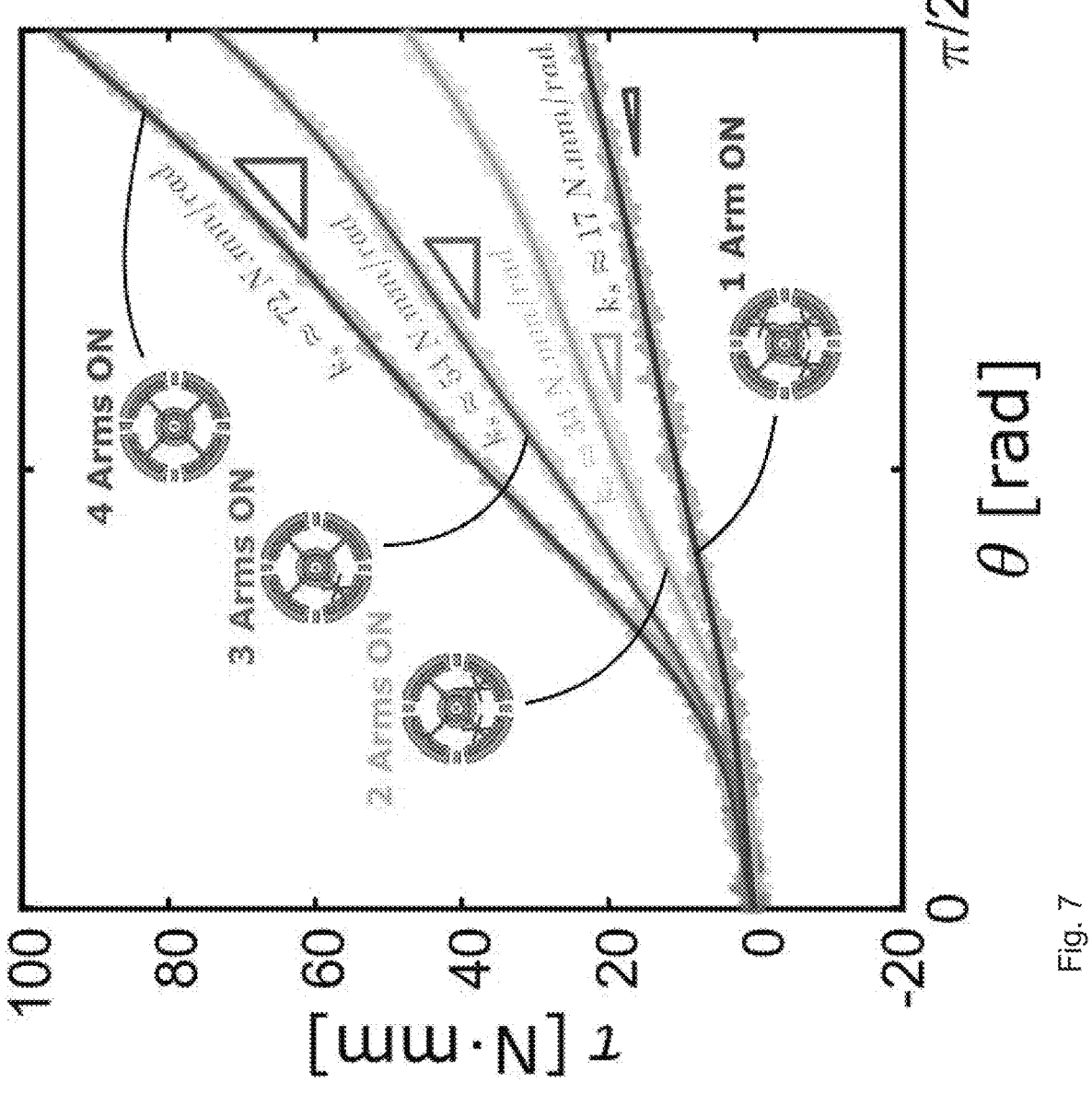
FIG. 7 is a graph presenting experimental torque response curves associated with different number of arms.

FIG. 7 presents another way of embodying a torsion spring which has a linear torque response curve. In this example one or more members made of elastic material, which may be referred to herein as "arms", may be provided between the components. Such members may be generally elongated for instance, as opposed to having a spiral shape, and their bending as the function of angular displacement may lead to a generally linear torque response curve. More specifically, in the graph of FIG. 7, four experimentally derived torque response curves are plotted, corresponding to configurations having a different number of resilient arms extending between the first component and the second component. In these experiments, the arms were straight and extended radially between the first component and the second component. Except for a restricted, flatter portion in the vicinity of the fully unloaded state, the torque response curves exhibit a roughly linear tendency. This graph can also serve to show that the stiffness of the torsion spring, associated with the amplitude of the slope, can be increased by increasing the number of distinct arms coupling the first component to the second component.

Figure 8B:
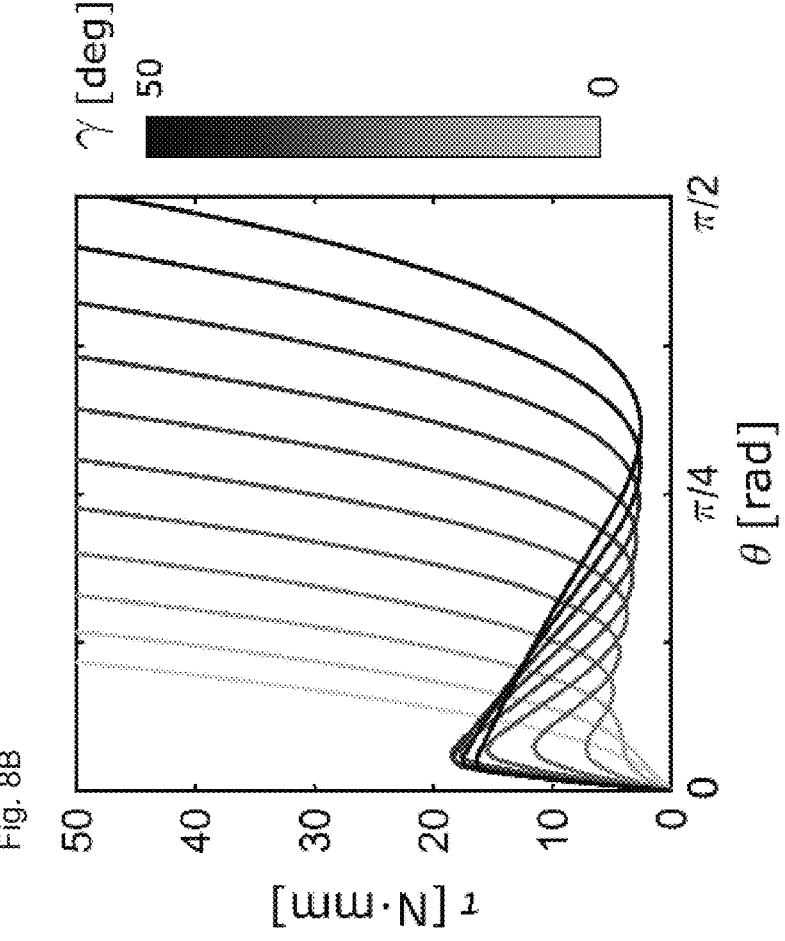
FIG. 8A is a schematic illustrating a configuration of a torsion spring consisting of a plurality of arms obliquely sloping at an angle gamma, with FIG. 8B showing torque response curves for a plurality of angles gamma.
Figure 8A:
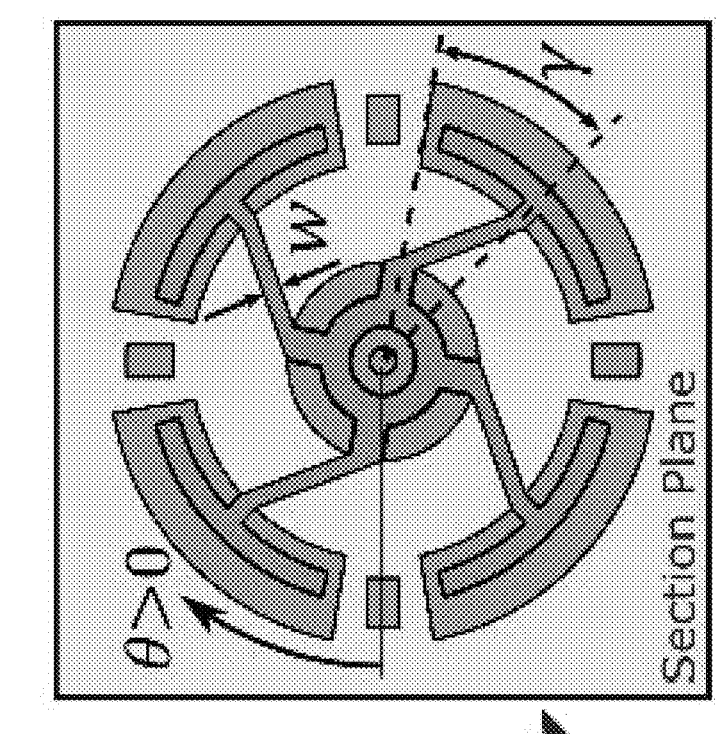

FIG. 8A presents yet another embodiment but where the arms forming the torsion spring slope obliquely in the circumferential orientation by an angle Y measured here from a purely radial orientation, rather than extending purely along the radial orientation. The effect of increasing angle Y is presented in the plot of FIG. 8B where it can be seen that increasing the angle Y between zero and 50 degrees has the effect of increasing the non-linearity of the torque response curve, and even introducing, above a relatively small value of Y, a peak followed by a dip in the torque response, which become more and more pronounced with increasing values of Y. This dip can be harnessed to move the second position of stable equilibrium, angularly away from the reference position of fully unloaded torsion spring, potentially increasing the potential amount of energy trapping. The dip can also be harnessed to help the torque response curve cross the zero torque line at one or more additional angular positions. Indeed, by combining a magnet arrangement having two or more magnets in one component for the magnet in the other component to couple with (e.g. configurations such as shown in FIG. 2A, 2B or 2C), a plurality of dips distinct from the reference position may be achieved, potentially associated to different values of energy trapping in a same system. More specifically, the dip in the magnetic torque response curve can be made to angularly coincide with the dip in the torsion spring torque response curve, an example of which will now be presented.

Indeed, the negative incremental torsional stiffness in a rotational magnet pair can be used in parallel with elastic structural elements, such as elastic beams, to form a rotationally bistable unit cell. From the energy trapping perspective, a bistable unit cell may be capable of locking-in most of the input energy ($E_{in}$) required for moving it from its undeformed configuration to the deformed one, i.e. passing the energy barrier in loading direction. We denote the reduction in potential energy by $E_{out}$, which is the minimum amount of energy the unit cell requires to recover its initial undeformed configuration with no energy release. As a result, the amount of trapped energy in the unit cell can be quantified by $E_{in}-E_{out}$, which implicitly excludes monostable unit cells with no defined $E_{out}$. By increasing $E_{in}$ and decreasing $E_{out}$, one can improve the energy trapping capacity of the unit cell; however, when $E_{out}$ is small, the unit cell can hardly retain its deformed configuration in the presence of any disturbances. Therefore, a reasonable amount of $E_{out}$ should be sought in designing energy trapping unit cells taking into account the existing disturbances and energy requirements.

In one example, rotational unit cell can be achieved by connecting the a first component provided here in the form of a hub to a second component provided here in the form of a ring with four elastic arms inserted into grooves provided in these parts, as generally shown in FIG. 8A. The arms can be made, for example, out of silicon rubber. A general tilted arm design, in which the root angle γ sets the angular position of the root of the first arm on the ring with respect to the hub while all the adjacent arms make right angles with each other. The tilted arm design is an intuitive choice to induce rotational bistability by taking advantage of the tilted beams as mechanical negative stiffness elements.

Figure 9:
FIG. 9 presents an example embodiment for energy trapping (a) The hub and the ring are connected using elastic arms in the form of tilted beams with a width of w, out-of-plane thickness of h, and the root angle $\gamma$ such as shown in FIG. 8A. (b) Without a rotational magnet pair, the unit cell is not bistable. Adding a rotational magnet pair in FOP orientation, in which pairing occurs at $\theta=\pi/4$, makes the unit cell bistable. (c) By changing the poles orientation from FOP to FSP, the energy trapping capability of the unit cell can be enhanced (e.g. with an air gap of 1 mm, $E_{in}$ is increased by more than 200% while there is a slight reduction in $E_{out}$). (d) Effect of the geometric parameters on $E_{in}$ and $E_{out}$ (in a positive rotation) using a rotational magnet pair in FSP orientation and with an air gap of 1 mm. (e) Contour plots showing how the bistability and energy trapping index of the unit cell (in a positive rotation) can be tuned by adjusting the air gap in the rotational magnet pair with FSP orientation.
Figure 9:
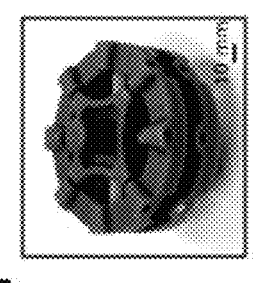
Figure 9:
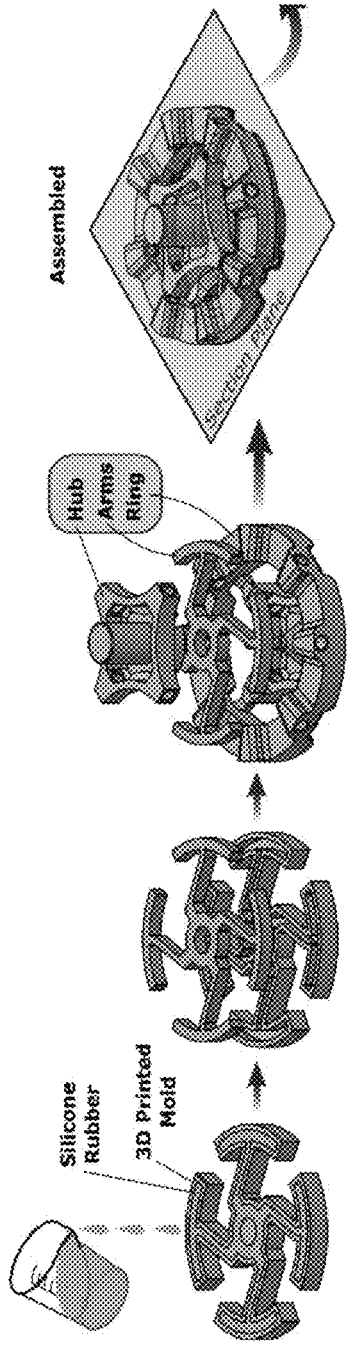

However, FIG. 8B shows that achieving rotational bistability only with tilted arms is not an effective method even for different values of γ. As an example, the τ-θ curve of a four-arm unit cell with the root angle γ=35° and the width w=2.71 mm, without any embedded magnets in the hub or the ring, shows a monostable response that is on the verge of bistability with the curve almost touching the zero torque line (the blue line in FIG. 9b). Therefore, there is no trapped energy in the unit cell. A magnetic negative stiffness element is introduced into the unit cell by embedding a pair of magnets, one in the hub and one in the ring, such that the rotational magnet pairing with an FOP orientation occurs at θ=π/4. The magnetically induced negative stiffness is used to tailor the τ-θ curve such that it crosses the zero torque line, thus making the unit cell bistable (red and yellow lines in FIG. 9b). In these conditions, $E_{in}$ and $E_{out}$ can be defined and quantified as the areas enclosed by the τ-θ curve above and below the zero load line, respectively (see the highlighted areas for the yellow curve in FIG. 9b). Decreasing the air gap in the rotational magnet pair leads to smaller $E_{in}$ and larger $E_{out}$. Although it seems beneficial in increasing the bistability of the unit cell, it is deemed inappropriate from the energy trapping perspective, as it results in smaller $E_{in}-E_{out}$. When the unit cell is rotated in the opposite direction (θ<0), the elastic arm do not go through structural instability and experience only stretching, hence monotonic stiffening.

By changing the poles orientation from FOP to FSP, the τ-θ curve can be reformed as demonstrated in FIG. 9c with the middle part (around θ=π/4) almost mirrored with respect to the zero load line. In this case, the unit cell is still bistable; however, the second stable equilibrium point is shifted to a larger angular position (the red point in FIG. 2c). Due to this transformation, $E_{in}$ is increased since a big portion is added to the area under the τ-θ curve and above the zero load line, while $E_{out}$ remains almost the same with just a slight reduction. This is considered beneficial from the energy trapping standpoint since we can increase the amount of trapped energy by merely changing the poles orientation of the magnets. Furthermore, in contrast to FOP, decreasing the air gap between the magnets with FSP orientation results in both larger $E_{in}$ and $E_{out}$. Hence, one can strengthen the bistability of the system without sacrificing its energy trapping capability.

The structural behavior of the elastic arms can be simulated by carrying out an FEA in COMSOL Multiphysics employing Yeoh hyperelastic incompressible material model.[51] The material constants are determined based on uniaxial tensile test results. The results of FEA provide us with the relationship between the applied torque and the angular displacement of the unit cell in the presence of the elastic arms but with no embedded magnets. To consider the effect of embedded rotational magnet pair on the torsional response of the unit cell, we adopt the DNI method and superimpose the τ-θ relationship of the magnets onto that of the arms. This is quite reasonable since two components of the torque, one originating from a structural source (the elastic arms) and the other stemming from the magnetic interactions (the magnet pair), are completely independent. The simulated τ-θ curves plotted along with the experimental data in FIG. 9b-c show a good agreement between the simulation and experimental results. Accordingly, we carry out a parametric study to investigate the effect of the geometric parameters of the arm, i.e. the root angle, γ, and the width, w, on $E_{in}$ and $E_{out}$, the results of which are demonstrated in FIG. 2d. The width of the arm is normalized with respect to its thickness (h), which is 5 mm and constant throughout the study. The grey area corresponds to the parameter values for which the unit cell has a monostable response. As expected, increasing the width of the arm with a particular tilt angle, yields larger amounts of $E_{in}$ until the magnetic torque is inadequate to cancel out the elastic torque and hence the unit cell becomes monostable. In this case, we can increase Y and exploit the elastic buckling of the arms to help the system move back to the bistable region. Moreover, the larger amounts of $E_{out}$ correspond to thinner arms with a larger tilt angle where the magnetic component of the torque dominates and further moves the $\tau$–$\theta$ curve below the zero torque line.

We introduce the ratio $(E_{in}-E_{out})/E_{in}$ as an energy trapping index, which denotes what portion of the supplied energy is locked in the unit cell, and present the corresponding contour maps in terms of the geometric parameters of the arm in FIG. 9e for three different values of the air gap between the magnets. The unit cell with only elastic arms, without any embedded magnets, is hardly bistable, even by taking advantage of the elastic buckling of the arms that, at best, results in $\tau$–$\theta$ curve merely touch the zero torque line. Therefore, with any specified arm geometries, the magnetic interaction is the main means to make the unit cell rotationally bistable. Accordingly, by decreasing the air gap between the magnets, and hence increasing the magnetically induced negative torsional stiffness, we can enlarge the region in which the unit cell is bistable and energy trapping occurs. As expected, the energy trapping index tends to one as we get closer to the separating border of the bistable and monostable regions. In the presence of any disturbances in the environment, such as mechanical vibrations or thermal variations, it would be a good practice to have the energy trapping index smaller than one. In this way, we make sure that the unit cell retains its deformed configuration without accidentally releasing the trapped energy due to existing disturbances.

By stacking several introduced energy trapping unit cells upon each other we are able to form a one-dimensional multistable architected metamaterial with rotational energy trapping, the concept of which is schematically demonstrated in FIG. 10a. In the stacked formation, the hub and the ring of the unit cell are connected to the ring of the upper cell and the hub of the lower cell, respectively. In this way, the meta material is formed by tessellating the cells in their axial direction. The interaction between two magnet pairs in adjacent layers is negligible and can be ignored due to sufficient lateral distance between them, which is here at least 10.5 mm. The cross-sectional view shows the arrangement of the tilted arms and indicates the direction of the positive angular displacement, which is clockwise if viewed from the top. In order to characterize the behavior of the energy trapping material, we build an experimental setup with 5 unit cells as shown in FIG. 10b. Each unit cell consists of four elastic arms connecting the hub to the ring and includes an embedded rotational magnet pair with an air gap of 3 mm in which pairing occurs at $\theta=\pi4$. The torque and potential energy variations of the unit cell are experimentally measured and calculated with respect to the angular displacement. The unit cell has two stable equilibrium states, which are denoted by $\theta_{s0}$ and $\theta_{s1}$ and are specified by red dots on the $\tau$–$\theta$ curve at about 0 and 54 degrees, respectively.

To distinguish multiple stable configurations and the sequence at which the tessellated cells snap under the angular displacement, we divide the $\tau$–$\theta$ curve of the unit cell into three different phases: phases [0] and [1] that include angular positions smaller than $\theta_{max}$ and greater than $\theta_{min}$, respectively, and a transient phase [*] that lies between phases [0] and [1]. The stable configurations associated with these phases can also be denoted by [0] and [1] (FIG. 10b). The phase boundaries $\theta_{min}$ and $\theta_{max}$ correspond to the first local maximum ($\tau_{max}$) and the last local minimum ($\tau_{min}$) of the $\tau$–$\theta$ curve, respectively. When the cell is in phase [0] or [1], it shows a monotonic response with a positive torsional stiffness or a convex potential energy landscape. However, while in phase [*], the unit cell experiences a non-monotonic behavior due to the negative stiffness induced by mechanical buckling of the arms and magnetic interactions in the rotational magnet pair. In a tessellated formation, where N unit cells are in series with each other, we use an N-digit code in brackets to specify the phase of the material with every digit denoting the phase of the corresponding unit cell. The first digit on the left is associated with the unit cell 1 while the rightmost digit indicates the phase of the last cell. For example, in the case of a 5-cell system, indicates that all the cells are in their phase [0] except cell number 2 and 5, which are located in phase [1].

Having defined different phases in the $\tau\theta$ curve of a single cell, we now analyze the experimental response of the rotational architected material made out of 5 unit cells during loading and unloading, which is plotted in FIG. 10c. We start from the point where all the unit cells are in their initial equilibrium state (the bottom left picture with a red border). As we rotate the material in the positive direction (indicated by a red curved arrow in FIG. 3a), we move on a line associated with phase [00000] until one of the cells reaches its $\tau_{max}$ sooner than the others and enters its transient phase. Although the cells are supposed to be similar, small defects in manufacturing lead to subtle differences in the $\tau$–$\theta$ curve of the cells, which in turn results in slight variations in their $\tau_{max}$ and $\tau_{min}$. In our case, cell 4 has the smallest $\tau_{max}$ and hence is the first cell to change phase in the loading direction. Orange labels attached to the cells are used to highlight the phase shifts that occur during loading and unloading. As we continue rotating the material, cell 4 snaps to phase [1] and the material shifts from phase [00000] to phase [00010]. Unloading the material at this phase would result in reaching a stable equilibrium configuration where all the cells rest at their first stable equilibrium state except cell 4 that stabilizes at the second stable equilibrium state. By further rotating the material, the cells change phase one after another until the material reaches phase [11111]. As we twist the material, a portion of the input energy is trapped in the material with each cell snapping to its second equilibrium state. When the material is stabilized at phase [11111], all the cells have already shifted their phase from [0] to [1] and hence contribute to the overall energy stored in the material. Beyond this point, the stiffness increases monotonically with no further stable configurations. In order to return the material to its initial configuration in a quasi-static displacement controlled manner, we need to feed an amount of energy at each step to cross the energy barrier and make the cells move back to their first equilibrium state one after another to release the whole trapped energy in the material.

Our experiment shows that during loading the phase shift does not occur in a routine sequence from cell 1 to cell 5 due to the slight differences in $\tau_{max}$ each cell. The non-sequential phase shift also holds during unloading; however, interestingly, it is not the exact opposite of the loading path. This is because at each cell the phase shifting boundary from phase [1] to the transient phase [*] is $\tau_{min}$ instead of $\tau_{max}$, and therefore, small discrepancies in the values of $\tau_{min}$ of the cells govern the phase shifting sequence along the unloading path. These discrepancies in tessellated bistable rotational unit cells result in reaching different stable configurations at the same angular position in loading and unloading directions; for instance, releasing the material at $\theta=\pi/3$ could yield two different stable configurations depending on whether we are on loading or unloading path ([00010] in the former and [10000] in the latter case).

FIG. 10c reveals that the realized rotational material has two different loading and unloading paths, which results in hysteresis loops in the $\tau$-$\theta$ curve and indicates the presence of snap-back instabilities in the material. The actual path of the 1D tessellated material can be captured, which represents a system of bistable rotational unit cells in series, and accurately calculate the potential energy with respect to the angular displacement during the loading and unloading (FIG. 10d). The jumps observed in the U−$\theta$ curve correspond to the energy releases during the snap-backs in the loading and unloading paths and correlate well with the hysteresis loops observed in the corresponding $\tau$−$\theta$ curve (FIG. 10c). The dynamic response of the rotationally multistable architected material is expectedly different from the quasi-static displacement controlled behavior. To capture the dynamic response, the amount of energy required to move the first cell back to its initial equilibrium state can be supplied by placing it in the transient phase (and to the left of the unstable equilibrium position indicated by a black dot in FIG. 10b) and let the material dynamically respond to these initial conditions. This can be analogously simulated with a ball placed at the top of the U−$\theta$ curve and on the edge of the last step. With a slight push towards the next stable configuration, a portion of the stored potential energy is transformed into kinetic energy and some part of it is lost due to dissipations (through snap-back instabilities and energy loss in the base material/assembled components) along the path. With enough kinetic energy at each step to move past the corresponding energy barrier, the material can continue its path down the potential energy curve until it reaches the lowest energy state (stable configuration [00000]). The dynamic behavior of the architected material using a 1D mechanical model can be characterized. The mass moment of inertia of the unit cell in this example can be approximately 46 Kgmm$^2$ calculated using a CAD model designed in SolidWorks. Moreover, to demonstrate the dynamic response of each cell, we normalize the angular displacement of the unit cell by defining the angular strain $\epsilon_\theta$, which is calculated by $$\epsilon_{\theta,i} = \frac{\theta_i - \theta_{s,0}}{\theta_{s,1} - \theta_{s,0}}$$

for the $i^{th}$ cell. Therefore, the angular strain of unity means the corresponding cell is in its second stable equilibrium state. The simulated dynamic response of the material, also demonstrated in FIG. 10d, reveals that, in contrary to the position-controlled quasi-static test (FIG. 10c), the phase shift occurs in a sequence from the first cell to the last one. This is similar to a domino effect in which the release of trapped energy in one cell initiates the phase shift in the adjacent cell until all the cells return to the first stable configuration corresponding to the lowest potential energy state. The sequential phase shift, in fact, can bring about a rotational wave propagation. A portion of the energy released at each step is lost due to the dissipations in the material. The remaining part can initiate the phase shift if it is larger than the energy barrier of the corresponding cell. In our experiment, the last cell is grounded and the excess energy in the phase shift of the last cell translates into vibrations until it is completely vanished through dissipations in the material.

Figure 11:
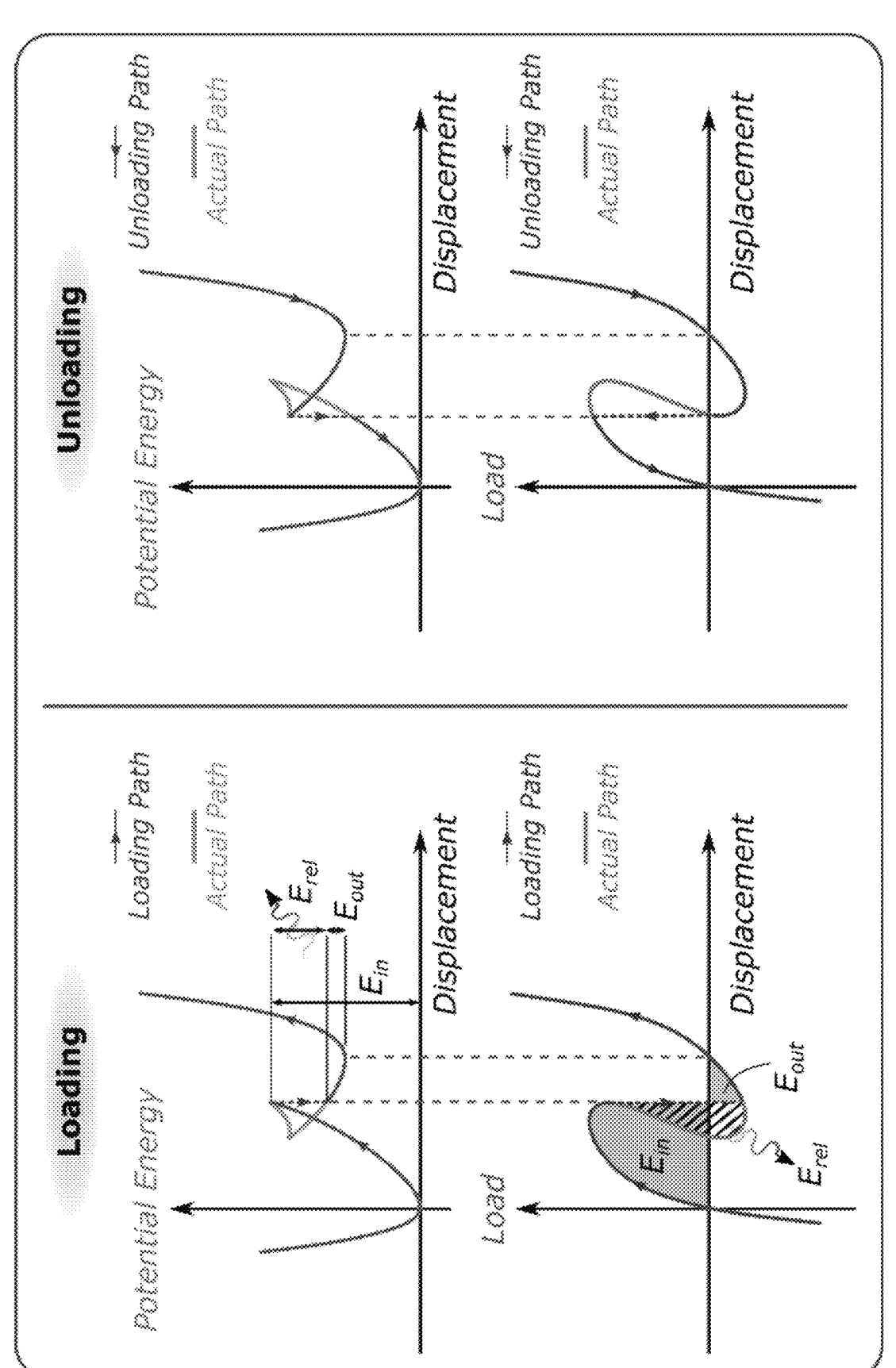
FIG. 11 schematically presents the load and potential energy curves with respect to the displacement of a bistable element showing a snap-back behavior with energy release. The element experiences a hysteretic behavior during loading and unloading due to the deviation between the loading and unloading paths.

The load and potential energy of a bistable element with snap-back instability are schematically plotted in FIG. 11. When experiencing snap-back instability, negative displacements are required at certain points to maintain a smooth change of the load value and to avoid instantaneous jumps. In order to guide the bistable element with snap-back instability through its actual path, extra constraints are necessary, which are not available in a simple displacement-controlled actuation. Therefore, the occurrence of snap-back is usually associated with jumps in an experimental load-displacement curve accompanied by energy release ($E_{rel}$) from the material. This results in different loading and unloading paths and hence a hysteretic behavior. The released energy can be utilized to perform specific functionalities or left to be dissipated.

The rotational system of magnets shows a snap-through behavior in load-controlled actuation. However, in a displacement-controlled actuation the unit cell does not experience any discontinuities in the form of sudden jumps or drops in the torque or potential energy. In this case, the system follows the same loading and unloading paths.

FIG. 12a presents an example embodiment having a first component having a first magnet, a second component having at least a second magnet, a third component, and a torsion spring connecting the second component to the third component. In this example, rather than being made of an elastic material, the torsion spring can be made of a viscoelastic material and associated with significant hysteresis. Each one of the first, second and third components can move rotationally relative the other ones, around a common rotation axis. The first component is coupled to the second component via the magnets, which can be placed in alignment and magnetic engagement by rotating the first component around the axis relative the second component. Henceforth, the relative rotation between the first component and the second component can exhibit a torque response curve such as shown in FIG. 1C, depending on the relative orientation of the magnet poles. The third component is coupled to the second component via a torsion spring. In this example, the torsion spring can exhibit viscoelastic properties, such as being made of one or more viscoelastic arms. Accordingly, the torque response curve between the third component and the second component can be such as shown in the graph presented in FIG. 7, for instance.

Since the torsion spring and the magnets do not operate on the same combination of components, the assembly can be referred to as a "series configuration" as opposed to a "parallel configuration". The "series configuration" can offer an additional degree of freedom of the magnet coupling to perform a full 360 degree rotation, and the overall torque response curve of the assembly is not simply the sum of the individual force response curves of the magnet coupling and of the torsion spring coupling in this embodiment as it was in the "parallel configuration". The magnet coupling can be oriented in a manner for the perfect alignment of the magnets to coincide with a fully unloaded state of the torsion spring. The magnet coupling can be of the same phase as the torsion spring coupling, such that the magnet coupling can be at its point of alignment and maximum magnetic force (though zero torque) as the torsion spring is fully unloaded at the stable equilibrium configuration, and generate an overall torque response curve can be such as presented in FIG. 12b. As presented in FIG. 12b, upon rotating the first component relative the third component from the stable equilibrium configuration via an external force, the assembly can first exhibit a generally linear torque response as a function of angular displacement, stemming from the combined, collaborative action of the magnet engagement and the torsion spring resistance which both generate a return force. The magnets collaborate to the torque response curve at the beginning by resisting the movement driven by the intermediary of the torsion spring. However, at one point, the torque generated by the magnet engagement is no longer sufficient to resist, and the second component rotates out from the magnetic engagement and then eventually back into the magnetic engagement, at which point it operates in an opposite angular direction until it crosses the perfect alignment position once again. When the torsion spring has viscoelastic properties, this process can release a significant amount of energy.

Figure 13:
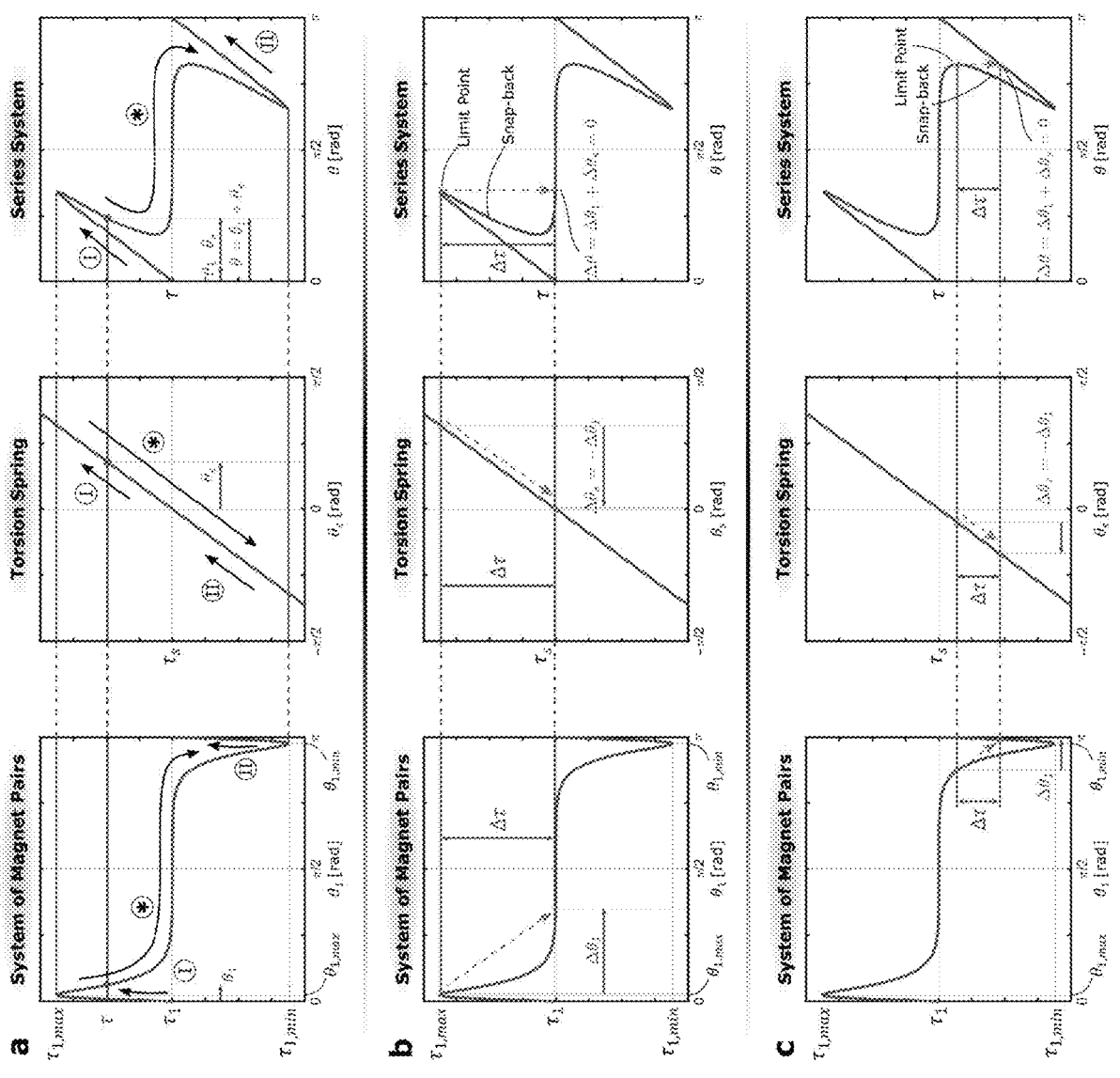
FIG. 13 schematically depicts snap-back instabilities and capturing the actual path of a series system such as presented in FIG. 12A (a) Knowing the current phase of the magnet pairs is necessary in plotting the actual path of the overall series system. For instance, with the system of magnet pairs in phase *, the point corresponding to the torque $\tau_1=\tau_s=\tau$, is shown with a red dot on each curve. The behavior of each component during the (b) first and (c) second snap-banks in the loading path is also demonstrated.

Indeed, by adding a torsion spring in series with rotational magnet pairs, we can change the overall response of the series rotational system such that it experiences discontinuities in torque or potential energy in displacement-controlled loading and unloading paths. The equivalent stiffness of the series system, k, can be calculated as follows:

$$k(\theta) = \frac{k_1(\theta_1)k_s}{k_1(\theta_1) + k_s}$$

where $k_1 = dT_1/d\theta_1$ and $k_s$ are the stiffness coefficients of rotational magnet pairs and the torsion spring, respectively. If $k_s \gg k_1$, the torsion spring can be assumed rigid and the overall response of the series system tends to the response of rotational magnet pairs with a snap-through behavior ($k=k_1$). By decreasing $k_s$, k also reduces and the overall system response further deviates from that of the rotational system of magnets. Due to the snap-through behavior, $k_1$ can be positive or negative. FIG. 13$a$ shows the schematic torque response ($\tau-\theta$) curve in a half cycle for rotational system of magnets with two magnets in the ring at $\theta_1=0$ and $\theta_1=\pi$. The local maximum and minimum torques are denoted by $\tau_{1,max}$ and $\tau_{1,min}$, respectively. At angular positions corresponding to these local extrema, i.e. $\theta_{1,max}$ and $\theta_{1,min}$, respectively, $k_1$ is zero. Between $\theta_{1,max}$ and $\theta_{1,min}$, $k_1$ is negative, and, therefore, if $k_s$ is small enough, the denominator can become zero for specific angular positions in this range leading to an infinitely large negative equivalent stiffness and making the series system on the verge of instability in a displacement-controlled loading. This point is often called the limit point. After this point, if $k_1$ continues to get more negative, the system experiences a snap-back instability in the form of discontinuities in $\tau-\theta$ curve and it appears that the system would follow another path, i.e. the actual path, if extra constraints were applied. The maximum value of $k_s$ that yields this kind of instability can be considered a limit for snap-back initiation. With the same reasoning, the series system would experience similar limit point in the displacement-controlled unloading path.

Since the magnet pairs and the torsion spring are in series, they share an equal amount of torque, i.e. $\tau_1 = \tau_s = \tau$; however, the angular displacement of the whole system is simply the summation of the angular displacements of the magnet pairs and the torsion spring, i.e. $\theta = \theta_1 + \theta_s$. In order to capture the actual path of the series system, we divide the $\tau_1-\theta_1$ curve into three phases (FIG. 12$a$) as phase I ($\theta_1 \leq \theta_{1,max}$), phase * ($\theta_{1,max} < \theta_1 \leq \theta_{1,min}$), and phase II ($\theta_1 < \theta_{1,min}$) and follow the steps below:

(1) We start at $\tau_1 = \tau_s = \tau = 0$ in phase I, where $\theta_1 \leq \theta_{1,max}$. By increasing $\tau$ step by step until $\tau_{1,max}$, we find the corresponding $\theta_1$ (in phase I) of rotational magnet pairs and $\theta_s$ of the torsion spring and hence the total angular position of the series system $\theta = \theta_1 + \theta_s$.

(2) The torque cannot exceed $\tau_{1,max}$, therefore, a phase transition from phase I to phase * shall occur in the rotational magnet pairs by an infinitesimal rotation. Subsequently, we decrease $\tau$ and find the corresponding $\theta_1$ (in phase *) and $\theta_s$. At this stage, if $k_s$ is small enough, by decreasing $\tau$, the backward angular displacement of the torsion spring can be greater than the forward displacement of the magnet pairs, leading to the overall negative angular displacement ($\Delta\theta < 0$). As a result, the series system moves backward in order to keep the continuity of the $\tau-\theta$ curve, hence the term snap-back.

(3) When the torque reaches the lower limit, i.e. $\tau_{1,min}$, the rotational magnet pairs should experience another phase transition to satisfy $\tau_{1,min} \leq \tau_1 \leq \tau_{1,max}$, but this time from phase* to phase II, after which $\tau$ needs to be increased. Similarly, by finding the corresponding $\theta_1$ (in phase II) and $\theta_s$, the angular position of the series system can be obtained.

In a displacement-controlled actuation, the angular position of the series system, $\theta$, is always increasing. Therefore, at snap-back limit points, since it cannot move backwards, the loading path deviates from the actual path of the system. The analyzed system in FIG. 13 has two snap-back points in a half cycle in the loading path. FIGS. 13$b$ and 13$c$ demonstrate how each component of the system behaves during the first and second snap-backs in the loading path. There is a drop of $\Delta\tau$ in the torque in both components corresponding to the forward and backward displacements $\Delta\theta_1$ and $\Delta\theta_s = -\Delta\theta_1$, respectively.

Figure 14:
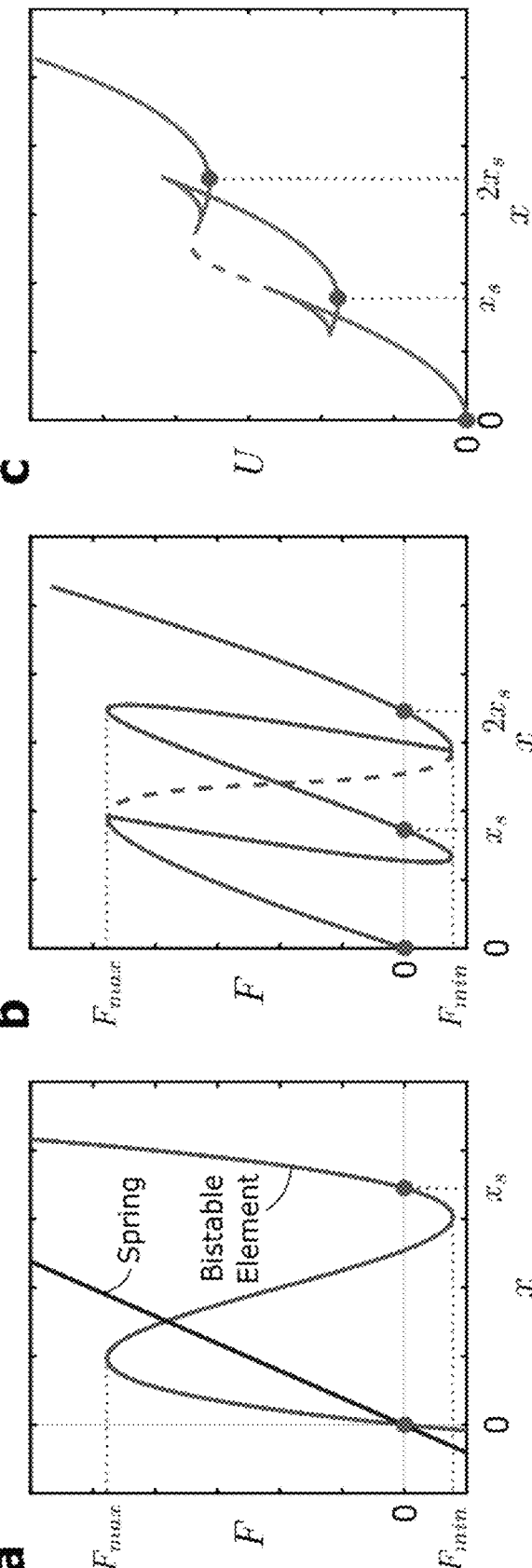
FIG. 14 schematically depicts determining the actual response path of a series system consisting of two identical bistable elements and one spring with constant stiffness. (a)
Figure 15:
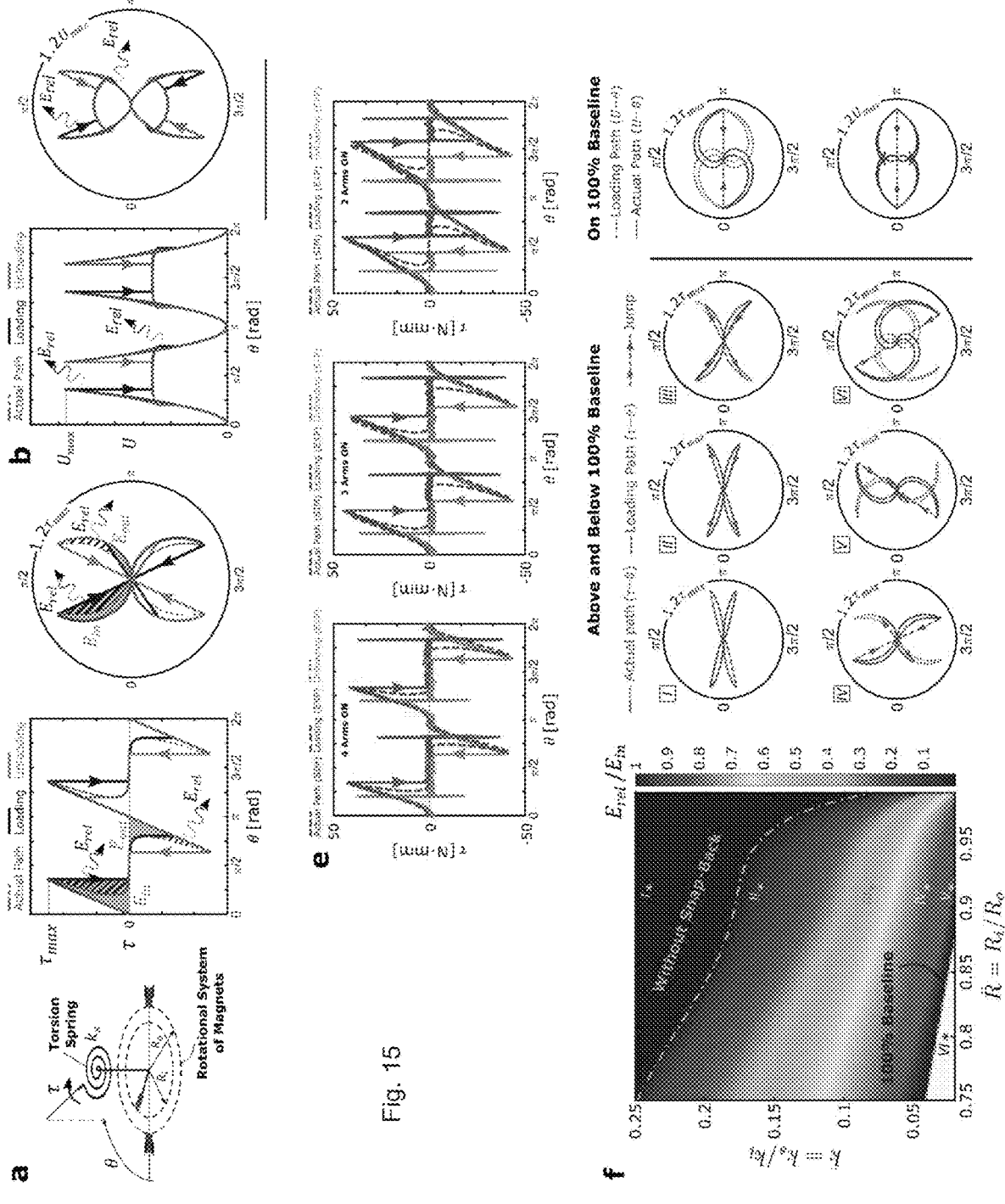

In FIG. 13, we have assumed a constant $k_s$ for the torsion spring to show the limit points and the occurrence of snap-back more conveniently. The aforementioned algorithm to capture the actual path of the system, however, can still be used in the case of more than one bistable element or a varying $k_s$. For instance, consider a series system consisting of two identical snap-through bistable elements and a spring with a constant stiffness to induce snap-back instabilities. The load-displacement curves for the bistable elements and the series spring are shown in FIG. 14$a$. The actual paths in load and potential energy curves with respect to the total displacement for the series system are determined by the aforementioned algorithm and plotted in FIG. 14$b$-$c$. The part of the load-displacement curve denoted with a hatched line is the high energy region in which both bistable elements have negative stiffness. This theoretical path is determined by the algorithm among every possible path on which the series system can move between different stable equilibrium states; however, in practice and with no additional constraints, the series system is always on the path with the lowest energy.

FIG. 15$a$ schematically demonstrates the aforementioned concepts in the $\tau-\theta$ curve of a series system consisting of rotational magnet pairs (with pairings that occur at $\theta=0$ and $\theta=\pi$) and a torsion spring of a constant stiffness ($k_s$) that is small enough to induce snap-back. The actual path of the series system can be captured. The input, output, and released energies are shown in a half cycle from 0 to $\pi$. The amount of released energy is equivalent to the hatched area under the $\tau-\theta$ curve. The potential energy curve with respect to the angular displacement (U–$\theta$) is also plotted in FIG. 15*b* to illustrate the different energy states associated with the actual, loading, and unloading paths. The drops in the U–$\theta$ curve correspond to the snap-back points where the system instantaneously alters its energy state by releasing a portion of its potential energy.

The snap-back induced released energy can be dissipated through vibrations by stimulating the internal damping of the system components. The energy dissipation can occur periodically due to repeating snap-back instabilities stemming from the cyclic behavior of the rotational system of magnets (polar plots in FIG. 15*a-b*). The concept of periodic energy dissipation enables us to utilize such a series system as a fluid-free rotary metadamper.

The stiffness of the torsion spring can be tailored by changing the geometric parameters of the arm, such as the thickness, or the base material; however, an easier strategy is to change the number of arms connecting the hub and the ring by cutting or separating some of them from the grooves provided on the ring. FIG. 15*e* shows the experimental loading and unloading $\tau-\theta$ curves for the rotary metadamper consisting of rotational magnet pairs in series with a torsion spring with three different stiffness coefficients, i.e. with four/three/two active arms. The actual $\tau-\theta$ path can be determined. Accordingly, we use the developed DNI method to simulate the magnetic torque in the rotational magnet pairs. The experimental and simulation results are in good agreement with each other and the method proves capable in predicting the snap-back points corresponding to the jumps in the loading and unloading paths. It is also perceived that decreasing the stiffness of the torsion spring may lead to increased inclination in the actual $\tau-\theta$ path, which in turn may result in more energy release due to the snap-back instability Indeed, assuming a constant stiffness coefficient for the torsion spring and normalizing it as $$\bar{k} = \frac{k_s}{k_{1l}}$$

where $k_{1l}$ is the stiffness of the rotational system of magnets at the position of a stable equilibrium state (e.g. at $\theta_1=0$ in FIG. 13*a*). It is the slope of $\tau_1-\theta_1$ curve at a stable equilibrium defined as:

$$k_{1l} = \left(\frac{d\tau_1}{d\theta_1}\right)_{at\ stable\ equilibrium}$$

We obtain the relation between $\tau_1$ and $\theta_1$ using DNI method. Subsequently, $\tau-\theta$ curve of the series system can be captured. FIG. 16 demonstrates how different values of $\bar{k}$ affects the behavior of the series system in a full cycle from 0 to $2\pi$. When $\bar{k}=\infty$, the torsion spring is rigid and the overall system behavior is similar to that of a rotational magnet pair. By decreasing $\bar{k}$, the contribution of the torsion spring in the overall system response increases leading to inclined $\tau-\theta$ curves with more snap-back leading to more release of energy.

To further explore the energy release due to the presence of snap-back instabilities in the elastic response of the rotary damper, we carry out a parametric study on how stiffness coefficients of the system affect the released to absorbed energy ratio ($E_{rel}/E_{in}$) in a half cycle (0 to $\pi$), the results of which are summarized in FIG. 15*f*. The parameter $\bar{R}=R_i/R_o$ represents the clearance between the magnets, which has a direct effect on the stiffness of the rotational magnet pairs. In our analysis, we assume a constant $R_o$ 30 mm and vary $R_i$ such that $\bar{R}$ is swept through a range of 0.75 to 0.99. We also define $\bar{k}=k_s/k_l$ that represents the normalized stiffness coefficient of the torsion spring with respect to the linearized (initial) stiffness of the rotational magnet pair. The results indicate that for a constant $\bar{R}$, by decreasing $\bar{k}$ below a certain limit, the system starts to release energy due to snap-back instabilities. Therefore, we can plot a limiting line that separates the study space into two regions. Within the region above the dash-dotted line there is no snap-back occurrence and hence no release of energy. However, below the line, the system experiences snap-back instabilities thus releasing a portion of the absorbed energy. One can obtain the equation for the snap-back limit line by considering the equivalent stiffness of the system. As we further decrease $\bar{k}$, a bigger portion of the absorbed energy is released, i.e. higher $E_{rel}/E_{in}$, due to the intensified snap-back instabilities. To illustrate the transition from no snap-back region to the region where snap-back occurs, we plot the $\tau-\theta$ curves corresponding to the points I to V. When there is no snap-back (point I), the loading path completely overlaps with the actual path. In this case, the series system response is governed by the softer cell, i.e. the rotational magnet pair, which is depicted with four wings in the polar representation of the $\tau-\theta$ curve. By decreasing $\bar{k}$, the wings start to bend toward each other and the series system experiences a series of jumps in torque and potential energy as the loading path separates from the actual path. Furthermore, the first snap-back occurs at a greater rotation angle for smaller values of $\bar{k}$. We can decrease $\bar{k}$ to a value at which the first snap-back happens at an angular position corresponding to the second equilibrium position, i.e. $\theta=\pi$. In this case, the system theoretically releases 100% of its absorbed energy neglecting any other forms of energy dissipation from 0 to $\pi$. The values of $\bar{k}$ and $\bar{R}$, for which this condition holds, form a line that we call 100% baseline. $\tau-\theta$ and U–$\theta$ curves for a point on 100% baseline are plotted in FIG. 15*f*. Below this line, there would be no snap-back instabilities in the range of $\theta=0$ to $\pi$; however, the system still experiences jumps at angular positions above $\theta=\pi$, where a portion (lower than 100%) of the absorbed energy is released. Accordingly, in some embodiments, it can be preferred for $\bar{k}$ to be between 0.25 and 0.01, below 0.2, below 0.15 or below 0.1. The optimization of the parameter $\bar{k}$ can be left to a person having ordinary skill in the art in view of the above and in view of the specificities of a given embodiment.

The efficiency of the energy dissipation of the metadamper can be tested via an experiment wherein a flywheel is secured to the one end of the series system and the other end is fixed. The experimental setup is demonstrated in FIG. 17*a*. The system is supplied with a specific amount of energy and the metadamper is then left to dissipate the input energy through the snap-back induced energy release. The energy of the system can be correlated to the rotational speed of the wheel assuming the potential energy variations of the rotational magnet pairs may be negligible compared with the kinetic energy of the wheel. Consequently, a non-contact magnetic tachometer can be used to monitor the rotational speed of the wheel.

The time takes for the experimental setup to come to rest (zero angular velocity) is the merit indicator for the dissipation efficiency of the metadamper. In order to compare different cases, however, we need to make sure that an equal amount of energy is supplied to the metadamper. Hence, after we rotate the wheel, we start the timer when the tachometer reads about 300 pulses per minute, i.e. 60 rpm, and record the time (in seconds) it takes for the wheel to stop. For different stiffness parameters (8 case studies), the recorded times are reported in FIG. 17*b*. We characterize the dynamic behavior of the experimental setup using a one-dimensional mechanical model (assuming concentrated mass moments of inertia) with friction damping and plot the simulation results along with the tachometer readings in FIG. 17*b*. The good agreement between the simulation results and the experimental measurements indicates the capability of the simplified one-dimensional mechanical model to capture the dynamic behavior of the metadamper with a good accuracy. The results, in a complete agreement with our previous statements about the effect of $\bar{R}$ and $\bar{k}$ on the snap-back induced energy release, reveal that as we increase the energy release, we let the damper to dissipate a greater portion of the system kinetic energy at each cycle through the snap-back instabilities. For example, when there is no elastic torsion spring (rigid arms), and consequently no snap-back instabilities, it takes more than 25 seconds (cases 1 and 2) for the wheel to come to rest; however, as we introduce snap-back instabilities, the time required to stop can be extremely decreased to 9 seconds (about 65% reduction).

As shown in FIG. 18, a metadamper such as presented in FIG. 12A can be stacked with one or more metamaterial such as presented in FIG. 6A, by using one of the components of the metamaterial simultaneously as one of the components of the metadamper.

Detailed drawings of the ring and hub components used to produce the simulations and experiments associated with FIGS. 9 and FIGS. 10, 15 and 17 are presented in FIG. 19, for the sake of providing an exhaustive description of one amongst many possible embodiments. In this example, two types of hub has been designed; Type I is for mounting elastic arms in a tilted orientation used in rotational energy trapping unit cell. Type II design of the hub is for assembling the elastic arms with zero tilt angle that are employed to realize a torsion spring with positive torsional stiffness used in the designed rotary metadamper. The bottom part of the ring (FIG. 19*b*) has also the same design as the Type I hub, enabling us to stack multiple of these parts on each other and form a one-dimensional cellular metamaterial for energy trapping or rotational wave propagation. In this case, the bottom part of the ring of a unit cell acts as the hub for the adjacent unit cell. Accordingly, the mold for casting elastic arms out of silicon rubber also comes with two designs corresponding to two types of hub. Since the arms are inserted into the grooves provided on the hub and ring, we taper the sides of the grooves on the hub and the bottom part of the ring to ensure a secure grip and to prevent the elastic arms from popping out when deformed.

The diameter of the holes (4.8 mm) provided in the hub and the ring, which are used to hold the cylindrical permanent magnets (with a diameter of 4.7±0.1 mm) firmly in the place, are specified taking into account a small amount of contraction in the size of the SLA 3D printed parts after being washed and cured. This is required to ensure an interference fit between the embedded magnets and the holes. With the same manufacturing considerations, the diameter of the shaft (3.9 mm) in the center of the ring to mount the hub or another ring on is designed to yield a clearance fit allowing the parts to rotate freely with respect to each other.

The 3D printed parts in disassembled and assembled forms are presented in FIGS. 19*d* and 19*e*, respectively.

FIG. 15*c* demonstrates how a rotary metadamper such as shown in FIG. 15*d* is assembled by stacking a torsion spring and a rotational system of magnets in series. The torsion spring is realized by connecting hub 1 to ring 1 with elastic arms cast out of silicon rubber inserted into the grooves provided on these parts (similar to the rotational unit cell in FIG. 9*a*); however, we use straight arms to avoid buckling and to maintain a positive torsional stiffness. The bottom part of ring 1 of the torsion spring serves as hub 2 of the system of rotational magnets. The permanent magnets are embedded in hub 2 and ring 2 (one magnet in hub 2 and two magnets in ring 2) such that rotational magnet pairing occurs at θ=0 and θ=π. Without elastic arms connecting hub 2 to ring 2, there is no limitations on the range of rotation angle and, therefore, the system of rotational magnets exhibits snap-through cyclic multistability.

It will be noted that the detailed description provided above concerns example embodiments only. There are other ways of implementing components coupled both via magnets and via a torsion spring than the radial coupling presented in association with the ring-hub examples presented above. FIG. 20 presents an example of such an embodiment wherein the coupling has more of an axial focus than of a radial focus. For instance, in the example presented in FIG. 20, the magnets can have magnet poles generally axially oriented and radially offset from the rotation axis, to produce a comparable torque response than the one associated with radially-oriented magnet poles. Similarly, the torsion spring can extend axially between the two components instead of radially between the two components. It will also be noted that in the specific example of FIG. 20, more than one pair of magnets are used, each pair becoming simultaneously engaged or disengaged upon rotary motion for increased magnetic force. Similarly, when staking metamaterial units, such as to produce a higher capacity energy trapping system, the staking can be as illustrated in FIG. 21 rather than as illustrated in FIG. 10*b*. Moreover, a series type configuration associated with damping capabilities can be also axially focussed, such as schematized in FIG. 22, instead of being radially-focussed, such as shown in FIG. 12A.

As can be understood, the examples described above and illustrated are intended to be exemplary only. The scope is indicated by the appended claims.

What is claimed is:

1. A metamaterial comprising:
a first component having a first magnet,
a second component having a second magnet,
a torsion spring coupling the first component to the second component,
the second component being rotatable relative the first component, via application of an external force, between
a first rotational configuration of stable equilibrium in which the torsion spring is unloaded and the first magnet is magnetically disengaged from the second magnet, the torsion spring maintaining the first rotational configuration in the absence of the external force; and
a second rotational configuration of stable equilibrium in which the torsion spring is loaded and the first magnet is magnetically engaged with the second magnet in the second rotational position, the loading of the torsion spring canceling the magnetic engagement and maintaining the second rotational configuration in the absence of the external force.

2. The metamaterial of claim 1 wherein the torsion spring includes at least one arm made of an elastic material.

3. The metamaterial of claim 2 wherein, in the first rotational configuration of stable equilibrium, the at least one arm slopes obliquely in the circumferential orientation of the rotation.

4. The metamaterial of claim 1 further comprising a third rotational configuration in which the first magnet is maximally magnetically engaged with the second magnet, the torsion spring maintaining the second rotational configuration away from the third rotational configuration against a bias of the magnets.

5. The metamaterial of claim 4 wherein the third rotational configuration is between the first rotational configuration and the second rotational configuration.

6. The metamaterial of claim 4 wherein the second rotational configuration is between the first rotational configuration and the third rotational configuration.

7. The metamaterial of claim 4 wherein, in said third rotational configuration, opposite poles of the first magnet and of the second magnet face one another.

8. The metamaterial of claim 4 wherein, in said third rotational configuration, same poles of the first magnet and of the second magnet face one another.

9. The metamaterial of claim 8 wherein the torsion spring includes at least one arm made of an elastic material and sloping obliquely in the circumferential orientation of the rotation when in the first rotational configuration.

10. The metamaterial of claim 1 being a first metamaterial, combined with a second metamaterial as claimed in claim 1, wherein the first component of one of the first metamaterial and of the second metamaterial is the second component of the other one of the first metamaterial and of the second metamaterial.

11. The metamaterial of claim 1 comprising a plurality of said first magnet and a plurality of said second magnet, wherein corresponding ones of said plurality of first magnets are magnetically engaged with corresponding ones of said plurality of second magnets in said second rotational configuration.

12. The metamaterial of claim 1 comprising a plurality of one of said first magnet and of said second magnet, wherein in said second rotational configuration, the other one of the first magnet and of the second magnet is magnetically engaged to a first one of the plurality of one of said first magnet and of said second magnet, further comprising a third rotational configuration of stable equilibrium in which the torsion spring is loaded and the other one of the first magnet and of the second magnet is magnetically engaged to a second one of the plurality of one of said first magnet and of said second magnet.

13. The metamaterial of claim 1 wherein the first component is a hub and the second component is a ring concentric to the hub, the rotation being around an axis common to the hub and the ring.

14. A method of trapping energy in a metamaterial having a first component having a first magnet, a second component having a second magnet, a torsion spring coupling the first component to the second component, the second component being rotatable relative the first component between a first configuration and a second configuration, the method comprising:

the unloaded torsion spring maintaining the metamaterial in the first configuration in the absence of an external force;

the external force moving the metamaterial from the first configuration to the second configuration sequentially across a peak and a dip of a torque response stemming from the combined action of magnetic engagement between the first magnet and the second magnet and from a loading of the torsion spring;

the loading of the torsion spring and the magnetic engagement collaborating in maintaining the second relative angular position in the absence of the external force.

15. The method of claim 14 wherein said moving the metamaterial includes including trapping the energy associated to a difference between an energy required to cross the peak and an energy freed by crossing the dip.

16. The method of claim 15 wherein the energy freed by crossing the dip is between 1 and 25% of the energy required to cross the peak.

17. The method of claim 14 wherein the second component further has a third magnet, further comprising a third component having a having a fourth magnet, a second torsion spring coupling the third component and the second component, the third component being rotatable relative the second component between a first configuration and a second configuration, and repeating the steps of maintaining, moving, and collaborating in maintaining between the third and second components.

18. The method of claim 17 further comprising releasing the trapped energy between the second and the first component and between the third and the second component in cascade.

19. A metamaterial comprising:

a first component having at least one first magnet;

a second component having at least one second magnet, the second component being rotatable relative the first component in a manner to bring the first magnet into magnetic engagement with the second magnet and out from magnetic engagement with the second magnet, the first magnet and the second magnet generating a first torque vs. angular position response curve;

a torsion spring coupling the first component to the second component, the torsion spring generating a second torque vs. angular position response curve, the second torque vs. angular position response curve being added to the first torque vs. angular position response curve in an overall torque vs. angular position response curve between the first component and the second component;

the overall torque vs. angular position response curve having a first zero torque crossing of positive slope at an angular position of unloading of the torsion spring, a torque peak between the first zero torque crossing and a second zero torque crossing, the second zero torque crossing having a negative slope, and a torque dip between the second zero torque crossing and a third zero torque crossing, the third zero torque crossing having a positive slope.

20. The metamaterial of claim 19 wherein the second torque vs. angular position response curve has a peak followed by dip.

21. The metamaterial of claim 19 wherein the first torque vs. angular position response curve has a peak followed by a dip.

* * * * *